US008915244B2

(12) United States Patent
von Behrens

(10) Patent No.: US 8,915,244 B2
(45) Date of Patent: Dec. 23, 2014

(54) CONCENTRATING SOLAR POWER WITH GLASSHOUSES

(71) Applicant: Glasspoint Solar, Inc., Fremont, CA (US)

(72) Inventor: Peter Emery von Behrens, San Francisco, CA (US)

(73) Assignee: Glasspoint Solar, Inc., Fremont, CA (US)

( * ) Notice: Subject to any disclaimer, the term of this patent is extended or adjusted under 35 U.S.C. 154(b) by 0 days.

(21) Appl. No.: 13/730,190

(22) Filed: Dec. 28, 2012

(65) Prior Publication Data

US 2013/0192585 A1    Aug. 1, 2013

Related U.S. Application Data

(63) Continuation of application No. PCT/US2011/042891, filed on Jul. 2, 2011.

(60) Provisional application No. 61/361,509, filed on Jul. 5, 2010.

(51) Int. Cl.
| | | |
|---|---|---|
| F24J 2/10 | (2006.01) | |
| F24J 2/54 | (2006.01) | |
| F24J 2/14 | (2006.01) | |
| F24J 2/38 | (2014.01) | |
| F24J 2/12 | (2006.01) | |
| F24J 2/46 | (2006.01) | |
| F24J 2/07 | (2006.01) | |
| F24J 2/18 | (2006.01) | |
| A01G 9/24 | (2006.01) | |

(52) U.S. Cl.
CPC .. *F24J 2/541* (2013.01); *F24J 2/14* (2013.01); *F24J 2/38* (2013.01); *F24J 2/12* (2013.01); *F24J 2/4609* (2013.01); *F24J 2/07* (2013.01); *F24J 2/18* (2013.01); *Y02B 10/20* (2013.01); *F24J 2002/1028* (2013.01); *Y02E 10/44* (2013.01); *Y02E 10/45* (2013.01); *Y02E 10/47* (2013.01); *A01G 9/243* (2013.01)

USPC ........... 126/692; 126/569; 126/571; 126/600; 126/601; 126/603; 126/605; 126/684

(58) Field of Classification Search
CPC .. F24J 2/1047; F24J 2/5233; F24J 2002/1028
USPC .......... 126/600–603, 569, 571, 605, 684, 692
See application file for complete search history.

(56) References Cited

U.S. PATENT DOCUMENTS

| 1,240,890 A | 9/1917 | Shuman et al. |
|---|---|---|
| 2,217,593 A | 10/1940 | London |

(Continued)

FOREIGN PATENT DOCUMENTS

| CN | 2050918 U | 1/1990 |
|---|---|---|
| CN | 2926930 Y | 7/2007 |

(Continued)

OTHER PUBLICATIONS

Proz, 'On the edge of manufacturing tolerance' [bulletin board], Mar. 12, 2005 [retrieved on Jan. 7, 2014]. Retrieved from the internet <http://www.proz.com/kudoz/English/military_defense/968330-on_the_edge_of_manufacturing_tolerance.html>.*

(Continued)

*Primary Examiner* — Jorge Pereiro
(74) *Attorney, Agent, or Firm* — Perkins Coie LLP

(57) ABSTRACT

A protective transparent enclosure (such as a glasshouse or a greenhouse) encloses a concentrated solar power system. The concentrated solar power system includes one or more solar concentrators and one or more solar receivers. Thermal power is provided to an industrial process, electrical power is provided to an electrical distribution grid, or both. In some embodiments, the solar concentrators are parabolic trough concentrators with one or more lateral extensions. In some embodiments, the lateral extension is a unilateral extension of the primary parabolic trough shape. In some embodiments, the lateral extensions are movably connected to the primary portion. In some embodiments, the lateral extensions have a focal line separate from the focal line of the base portion. In some embodiments, the greenhouse is a Dutch Venlo style greenhouse.

53 Claims, 13 Drawing Sheets

(56) References Cited

U.S. PATENT DOCUMENTS

| | | | |
|---|---|---|---|
| 2,221,919 | A | 11/1940 | Kenan |
| 2,859,745 | A * | 11/1958 | Von Brudersdorff ......... 126/681 |
| 3,672,572 | A | 6/1972 | Delfs |
| 3,847,136 | A | 11/1974 | Salvail |
| 3,923,039 | A * | 12/1975 | Falbel ........................ 126/600 |
| 3,962,873 | A | 6/1976 | Davis |
| 3,991,740 | A * | 11/1976 | Rabl ........................... 126/694 |
| 3,994,279 | A | 11/1976 | Barak |
| 3,996,917 | A * | 12/1976 | Trihey ........................ 126/576 |
| 4,003,366 | A * | 1/1977 | Lightfoot .................... 126/694 |
| 4,015,585 | A * | 4/1977 | Fattor ......................... 126/578 |
| 4,078,549 | A * | 3/1978 | McKeen et al. ............. 126/606 |
| 4,083,155 | A | 4/1978 | Lampert |
| 4,088,116 | A * | 5/1978 | Pastor ......................... 126/677 |
| 4,095,369 | A | 6/1978 | Posnansky et al. |
| 4,108,154 | A * | 8/1978 | Nelson ........................ 126/576 |
| 4,122,832 | A | 10/1978 | Hirschsohn et al. |
| 4,124,277 | A | 11/1978 | Stang |
| 4,149,523 | A | 4/1979 | Boy-Marcotte et al. |
| 4,159,712 | A * | 7/1979 | Legg ........................... 126/584 |
| 4,174,752 | A | 11/1979 | Slater et al. |
| 4,184,482 | A | 1/1980 | Cohen |
| 4,202,322 | A | 5/1980 | Delgado et al. |
| 4,209,222 | A | 6/1980 | Posnansky |
| 4,219,008 | A | 8/1980 | Schultz |
| RE30,407 | E * | 9/1980 | Lightfoot .................... 126/694 |
| 4,230,095 | A * | 10/1980 | Winston ...................... 126/657 |
| 4,237,864 | A * | 12/1980 | Kravitz ....................... 126/573 |
| 4,249,340 | A | 2/1981 | Maes, Jr. |
| 4,263,893 | A | 4/1981 | Pavlak et al. |
| 4,280,480 | A | 7/1981 | Raposo |
| 4,282,394 | A * | 8/1981 | Lackey et al. .............. 136/245 |
| 4,287,880 | A * | 9/1981 | Geppert ...................... 126/685 |
| 4,290,419 | A | 9/1981 | Rabedeaux |
| 4,314,604 | A | 2/1982 | Koller |
| 4,318,394 | A * | 3/1982 | Alexander .................. 126/575 |
| 4,333,447 | A | 6/1982 | Lemrow et al. |
| 4,343,533 | A | 8/1982 | Currin et al. |
| 4,372,386 | A | 2/1983 | Rhoades et al. |
| 4,386,600 | A | 6/1983 | Eggert, Jr. |
| 4,410,156 | A | 10/1983 | Pischzik |
| 4,423,719 | A | 1/1984 | Hutchison |
| 4,462,390 | A | 7/1984 | Holdridge et al. |
| 4,484,568 | A | 11/1984 | Witt |
| 4,597,377 | A * | 7/1986 | Melamed .................... 126/600 |
| 4,628,142 | A * | 12/1986 | Hashizume ................. 136/246 |
| 4,727,854 | A | 3/1988 | Johnson |
| 4,741,161 | A | 5/1988 | Belart et al. |
| 5,103,524 | A | 4/1992 | Vowles |
| 5,191,876 | A * | 3/1993 | Atchley ....................... 126/576 |
| 5,258,101 | A | 11/1993 | Breu |
| 5,344,496 | A * | 9/1994 | Stern et al. .................. 136/246 |
| 5,347,402 | A | 9/1994 | Arbogast |
| 5,520,747 | A | 5/1996 | Marks |
| 5,524,610 | A * | 6/1996 | Clark .......................... 126/682 |
| 5,851,309 | A * | 12/1998 | Kousa ......................... 136/248 |
| 6,017,002 | A | 1/2000 | Burke et al. |
| 6,129,844 | A | 10/2000 | Dobelmann |
| 6,233,914 | B1 | 5/2001 | Fisher |
| 6,294,723 | B2 * | 9/2001 | Uematsu et al. ............ 136/246 |
| 6,363,928 | B1 * | 4/2002 | Anderson, Jr. ............. 126/577 |
| 6,485,152 | B2 | 11/2002 | Wood |
| 6,508,850 | B1 | 1/2003 | Kotliar |
| 7,055,519 | B2 * | 6/2006 | Litwin ........................ 126/683 |
| 7,748,137 | B2 | 7/2010 | Wang |
| 7,858,875 | B2 | 12/2010 | Lu |
| 7,975,686 | B2 * | 7/2011 | Prueitt ........................ 126/694 |
| 7,992,553 | B2 | 8/2011 | Le Lievre |
| 8,056,555 | B2 * | 11/2011 | Prueitt ........................ 126/696 |
| 8,333,186 | B2 | 12/2012 | Jennings |
| 8,342,169 | B2 * | 1/2013 | Glynn ......................... 126/684 |
| 8,397,434 | B2 | 3/2013 | Bayne |
| 8,430,090 | B2 * | 4/2013 | Angel et al. ................ 126/601 |
| 8,604,333 | B2 * | 12/2013 | Angel et al. ................ 136/246 |
| 2001/0008144 | A1 * | 7/2001 | Uematsu et al. ............ 136/246 |
| 2003/0188477 | A1 | 10/2003 | Pasternak |
| 2004/0004303 | A1 | 1/2004 | Iskra |
| 2004/0055594 | A1 | 3/2004 | Hochberg et al. |
| 2006/0048770 | A1 | 3/2006 | Meksvanh et al. |
| 2007/0056726 | A1 | 3/2007 | Shurtleff |
| 2008/0066736 | A1 | 3/2008 | Zhu |
| 2008/0083405 | A1 * | 4/2008 | Kimura et al. ............... 126/690 |
| 2008/0163864 | A1 * | 7/2008 | Larson ........................ 126/694 |
| 2008/0216822 | A1 | 9/2008 | Lazzara et al. |
| 2008/0236227 | A1 | 10/2008 | Flynn |
| 2008/0308094 | A1 | 12/2008 | Johnston |
| 2009/0056698 | A1 | 3/2009 | Johnson et al. |
| 2009/0056699 | A1 | 3/2009 | Mills et al. |
| 2009/0056704 | A1 | 3/2009 | Donati et al. |
| 2009/0260359 | A1 | 10/2009 | Palkes |
| 2009/0277224 | A1 * | 11/2009 | Angel et al. ................. 65/60.1 |
| 2009/0277440 | A1 * | 11/2009 | Angel et al. ................ 126/601 |
| 2010/0000733 | A1 | 1/2010 | Chiesa et al. |
| 2010/0051016 | A1 | 3/2010 | Ammar |
| 2010/0300431 | A1 | 12/2010 | Carrascosa Perez et al. |
| 2011/0088686 | A1 | 4/2011 | Hochberg et al. |
| 2011/0126824 | A1 | 6/2011 | Conlon et al. |
| 2011/0174935 | A1 | 7/2011 | Bingham et al. |
| 2011/0203574 | A1 * | 8/2011 | Harding ...................... 126/595 |
| 2011/0240006 | A1 * | 10/2011 | Linke et al. ................. 126/600 |
| 2011/0277470 | A1 | 11/2011 | Benyaminy et al. |
| 2011/0291405 | A1 | 12/2011 | Burger et al. |
| 2012/0067337 | A1 | 3/2012 | Hall et al. |
| 2012/0125400 | A1 * | 5/2012 | Angel et al. ................ 136/246 |
| 2012/0152307 | A1 | 6/2012 | MacGregor et al. |
| 2012/0167873 | A1 | 7/2012 | Venetos et al. |
| 2012/0234311 | A1 | 9/2012 | Johnson et al. |
| 2012/0255309 | A1 | 10/2012 | Venetos et al. |

FOREIGN PATENT DOCUMENTS

| | | |
|---|---|---|
| CN | 200958464 Y | 10/2007 |
| CN | 101363958 A | 2/2009 |
| CN | 201359397 Y | 12/2009 |
| DE | 102004013590 A1 | 10/2005 |
| EP | 0946432 B1 | 10/1999 |
| EP | 988493 A1 | 3/2000 |
| JP | 56085508 | 7/1981 |
| JP | 2001082104 | 3/2001 |
| KR | 10-2008-0024309 | 3/2008 |
| WO | WO-2008153922 A1 | 12/2008 |
| WO | WO-2009126875 A2 | 10/2009 |
| WO | 2010040957 A2 | 4/2010 |
| WO | WO-2010088632 A2 | 8/2010 |
| WO | WO-2011053863 A2 | 5/2011 |

OTHER PUBLICATIONS

U.S. Appl. No. 13/861,168, filed Apr. 11, 2013, Von Behrens.
U.S. Appl. No. 13/861,196, filed Apr. 11, 2013, Von Behrens.
BrightSource Limitless, "Coalinga Project Facts, a BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_fact_sheet.pdf, 2 pages.
BrightSource Limitless, "Enhanced Oil Recovery Project—Coalinga," accessed Sep. 19, 2013, http://www.brightsourceenergy.com/coalinga, 2 pages.
Ha, Jeong Kyun, PCT/US2011/042907 PCT International Search Report, Feb. 24, 2012, entire document, Korean Intellectual Property Office, Seo-gu, Republic of Korea.
Ha, Jeong Kyun, PCT/US2011/042907 PCT Written Opinion, Feb. 24, 2012, entire document, Korean Intellectual Property Office, Seo-gu, Republic of Korea.
Ham, Joung Hyun, PCT/US2011/042906 PCT International Search Report, Mar. 9, 2012, entire document (4 pages), Korean Intellectual Property Office, Seo-gu, Republic of Korea.
Ham, Joung Hyun, PCT/US2011/042906 PCT Written Opinion, Mar. 9, 2012, entire document (6 pages), Korean Intellectual Property Office, Seo-gu, Republic of Korea.
International Preliminary Report on Patentability and Written Opinion of International Application No. PCT/US2011/042698 mailed Jan. 17, 2013, 6 pages.

(56) References Cited

OTHER PUBLICATIONS

International Search Report and Written Opinion issued in PCT/US2012/025832, mailed Oct. 23, 2012, 9 pages.
International Search Report issued in PCT/US2011/042968 completed on Mar. 9, 2012 (3 pages).
Lim, Hyung Gun, PCT/US2010/022780 PCT International Search Report, Oct. 13, 2010, entire document, Korean Intellectual Property Office, Seo-gu, Republic of Korea.
Lim, Hyung Gun, PCT/US2010/022780 PCT Written Opinion, Oct. 13, 2010, entire document, Korean Intellectual Property Office, Seo-gu, Republic of Korea.
Linder, Nora, PCT/US2010/022780 PCT International Preliminary Report on Patentability, Aug. 2, 2011, entire document, International Bureau of WIPO, Geneva, Switzerland.
Search Report issued for Chinese Patent Application No. 201080006211.6 issued Feb. 17, 2013.
Wilson, Bob. "Re: Why does a bridge have rollers under it? How do the rollers of a bridge work?", Newton Ask a Scientist! (DOE Office of Science) [online], Jan. 2, 2008 [retrieved from the internet <URL:http://web.archive.org/web/20080102111713/http://www.newton.dep.anl.gov/askasci/eng99/eng99556.htm>.
International Search Report and Written Opinion issued in PCT/US2011/042891 and mailed Mar. 12, 2012.
The Linde Group, "Enhanced Oil Recovery (EOR)", 1 page, accessed Oct. 7, 2013.
Champion Technologies, "Enhanced Oil Recovery." 2 pages, accessed Oct. 7, 2013.
Adventures in Energy, "Extracting Oil and Natural Gas." 1 pages, accessed Oct. 7, 2013.
Adventures in Energy, "Separating Oil, Natural Gas and Water." 1 page, accessed Oct. 7, 2013.
Chinese Office Action for application No. 201180042706.9, mailing date Aug. 21, 2014, 11 pages.

* cited by examiner

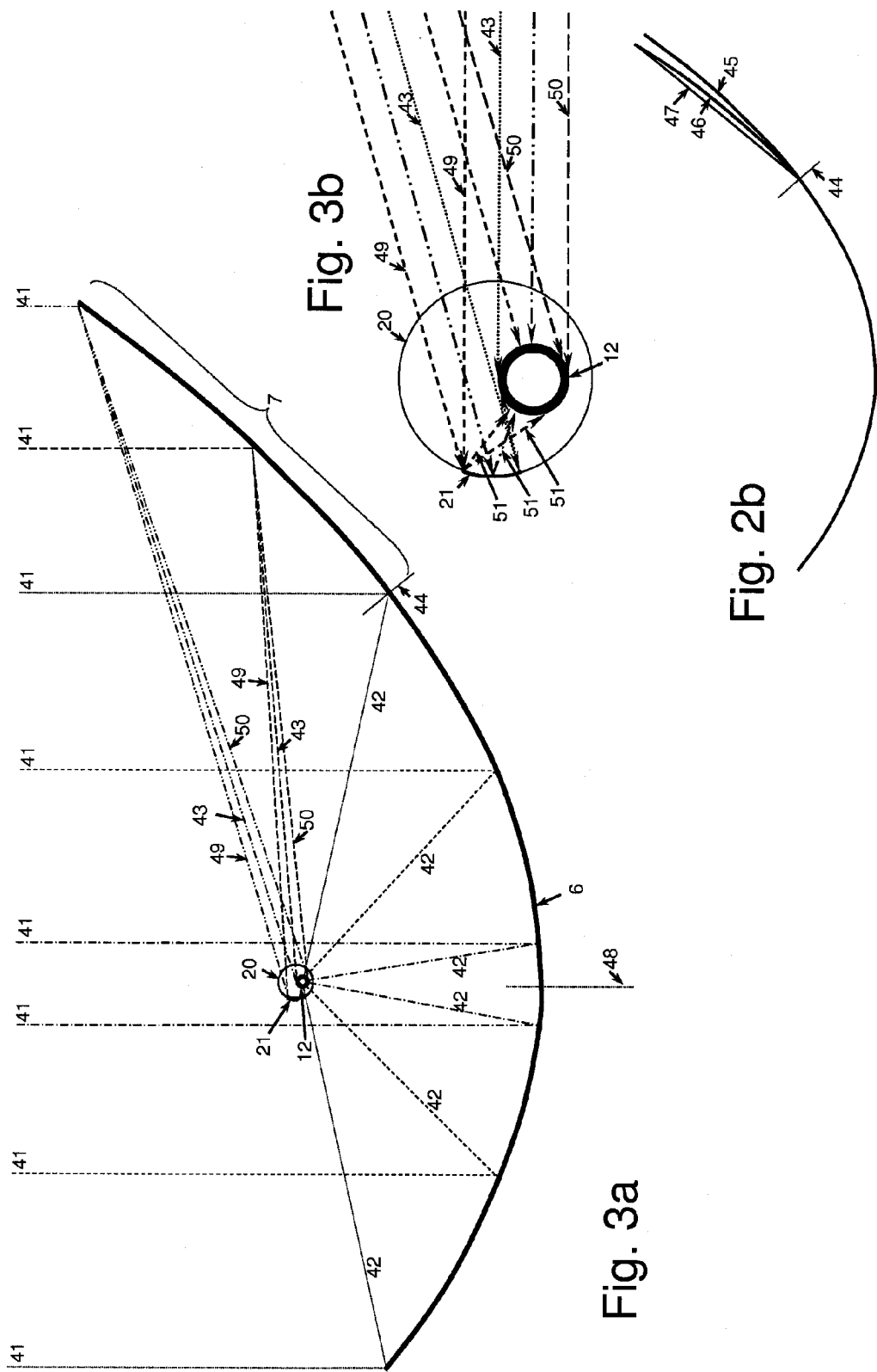

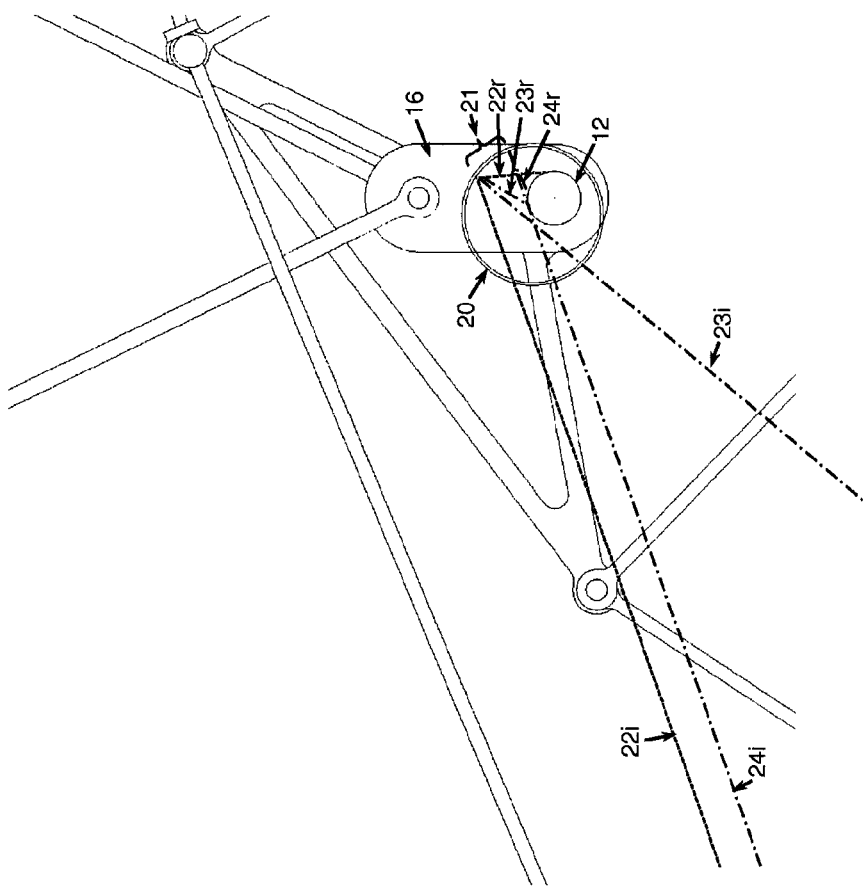
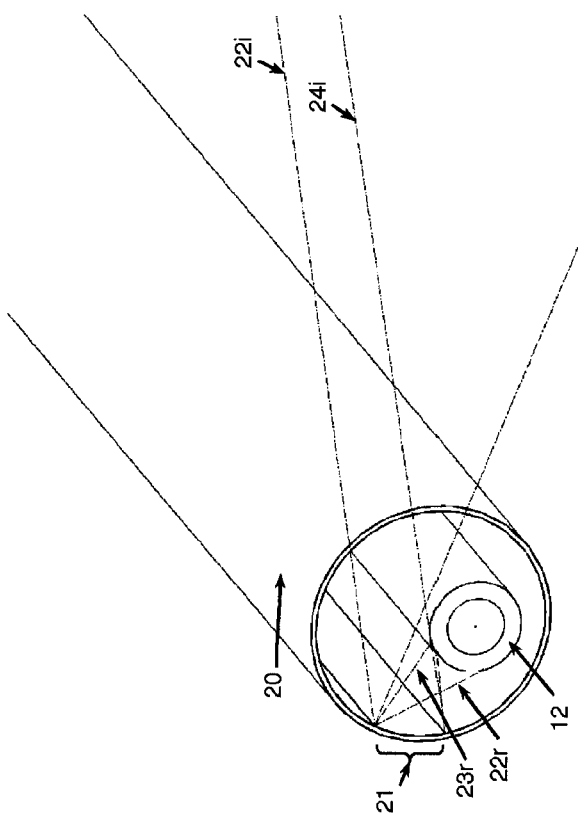

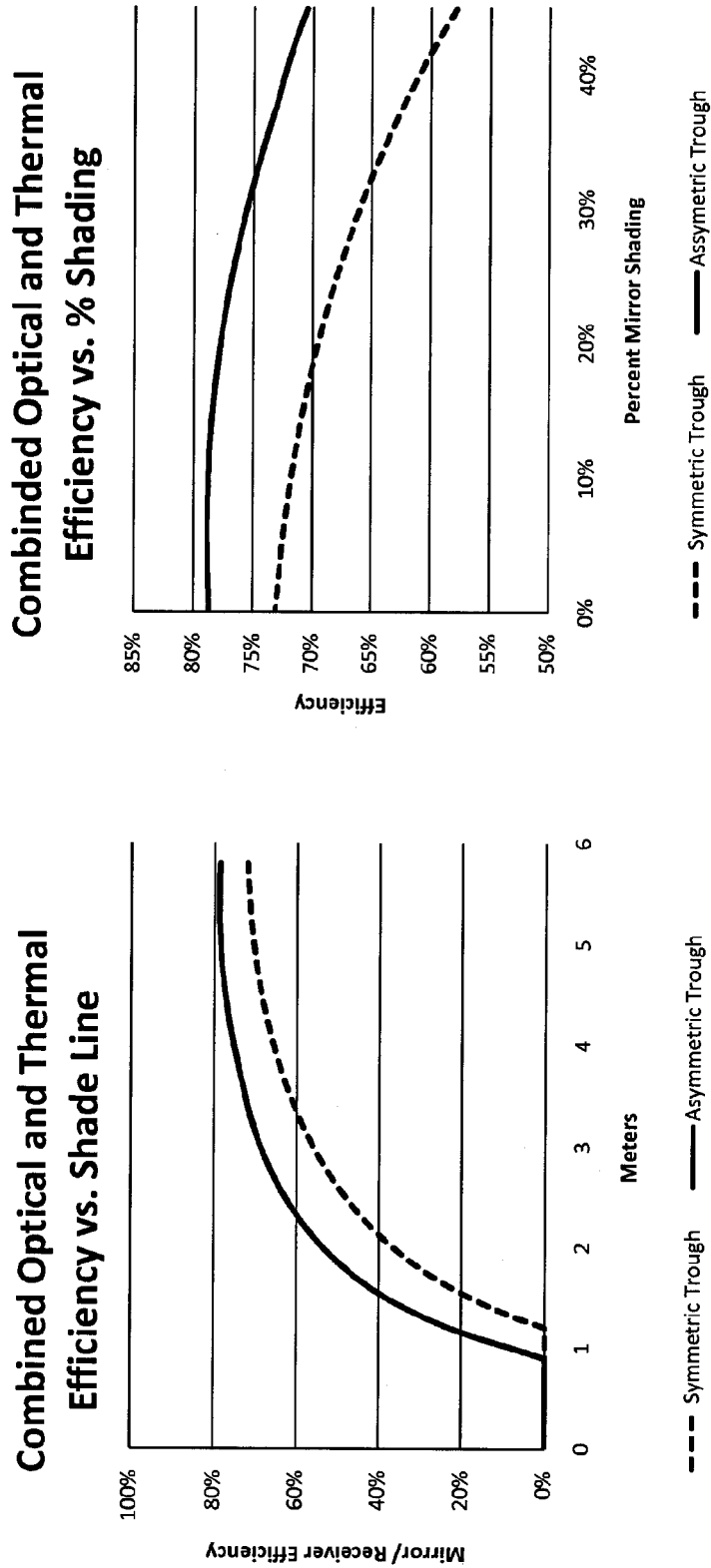

CONCENTRATING SOLAR POWER WITH GLASSHOUSES

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application (Ser. No. 61/149,292), filed Feb. 2, 2009, first named inventor Rod MacGregor, and entitled Concentrating Solar Power with Glasshouses;

U.S. Provisional Application (Ser. No. 61/176,041), filed May 6, 2009, first named inventor Peter Von Behrens, and entitled Concentrating PhotoVoltaics with Glasshouses;

PCT Application (Serial No. PCT/US10/22780), filed Feb. 1, 2010, first named inventor Roderick MacGregor, and entitled Concentrating Solar Power with Glasshouses; and U.S. Provisional Application (Ser. No. 61/361,509), filed Jul. 5, 2010, first named inventor Peter Von Behrens, and entitled Concentrating Solar Power with Glasshouses.

BACKGROUND

1. Field

Advancements in concentrated solar thermal power (CST), photovoltaic solar energy (PV), concentrated photovoltaic solar energy (CPV), and industrial use of concentrated solar thermal energy are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Concentrated solar power systems use mirrors, known as concentrators, to gather solar energy over a large space and aim and focus the energy at receivers that convert incoming solar energy to another form, such as heat or electricity. There are several advantages, in some usage scenarios, to concentrated systems over simpler systems that directly use incident solar energy. One advantage is that more concentrated solar energy is more efficiently transformed to heat or electricity than less concentrated solar energy. Thermal and photovoltaic solar receivers operate more efficiently at higher incident solar energy levels. Another advantage is that non-concentrated solar energy receivers are, in some usage scenarios, more expensive than mirror systems used to concentrate sunlight. Thus, by building a system with mirrors, total cost of gathering sunlight over a given area and converting the gathered sunlight to useful energy is reduced.

Concentrated solar energy collection systems, in some contexts, are divided into four types based on whether the solar energy is concentrated into a line-focus receiver or a point-focus receiver and whether the concentrators are single monolithic reflectors or multiple reflectors arranged as a Fresnel reflector to approximate a monolithic reflector.

A line-focus receiver is a receiver with a target that is a relatively long straight line, like a pipe. A line-focus concentrator is a reflector (made up of a single smooth reflective surface, multiple fixed facets, or multiple movable Fresnel facets) that receives sunlight over a two dimensional space and concentrates the sunlight into a significantly smaller focal point in one dimension (width) while reflecting the sunlight without concentration in the other dimension (length) thus creating a focal line. A line-focus concentrator with a line-focus receiver at its focal line is a basic trough system. The concentrator is optionally rotated in one dimension around its focal line to track daily or seasonal (apparent) movement of the sun to improve total energy capture and conversion.

A point-focus receiver is a receiver target that is essentially a point, but in various approaches is a panel, window, spot, ball, or other target shape, generally more equal in width and length than a line-focus receiver. A point-focus concentrator is a reflector (made up of a single smooth reflective surface, multiple fixed facets, or multiple movable Fresnel facets) that receives sunlight over a two-dimensional space and concentrates the sunlight into a significantly smaller focal point in two dimensions (width and length). A monolithic point-focus concentrator with a point-focus receiver at its focal point is a basic dish concentrated solar system. The monolithic concentrator is optionally rotated in two dimensions to rotate its focal axis around its focal point to track daily and seasonal movement of the sun to improve total energy capture and conversion.

A parabolic trough system is a line concentrating system using a monolithic reflector shaped like a large half pipe having a shape defined by the equation $y^2=4fx$ where f is the focal length of the trough. The reflector has a 1-dimensional curvature to focus sunlight onto a line-focus receiver or approximates such curvature through multiple facets fixed relative to each other.

A concentrating Fresnel reflector is a line concentrating system similar to the parabolic trough replacing the trough with a series of mirrors, each the length of a receiver, that are flat or alternatively slightly curved in width. Each mirror is individually rotated about its long axis to aim incident sunlight onto the line-focus receiver.

A parabolic dish system is a point concentrating system using a monolithic reflector shaped like a bowl. The reflector has a 2-dimensional curvature to focus sunlight onto a point-focus receiver or approximates such curvature through multiple flat or alternatively curved facets fixed relative to each other.

A solar power tower is a point concentrating system similar to the parabolic dish, replacing the dish with a 2-dimensional array of mirrors that are flat or alternatively curved. Each mirror (heliostat) is individually rotated in two dimensions to aim incident sunlight onto a point-focus receiver. The individual mirrors and an associated control system are parts of a point-focus concentrator with a focal axis that rotates around its focal point.

In solar thermal systems, the receiver is a light to heat transducer. The receiver absorbs solar energy, transforming it to heat and transmitting the heat to a thermal transport medium such as water, steam, oil, or molten salt. The receiver converts solar energy to heat and minimizes and/or reduces heat loss due to thermal radiation. In concentrated photovoltaic systems, the receiver is a photovoltaic surface that directly generates electricity from sunlight. In some solar thermal systems, CPV and CST are combined in a single system where a thermal energy system generates thermal energy and acts as a heat sink for photovoltaic cells that operate more efficiently when cooled. Other receivers, such as a stirling engine, that use solar energy to generate heat and then locally convert the heat to electricity through mechanical motion and an electric generator, are also deployed as a receiver, in some approaches.

In some concentrated solar systems, such as some systems with high concentration ratios, overall system is cost dominated by various elements such as the concentration system (such as a mirror or lens), a support system for the concentrators, and motors and mechanisms that enable tracking movement of the sun. The elements dominate the costs because the elements are enabled to withstand wind and weather. In some usage scenarios, solar energy systems are enabled to withstand various environmental dangers such as wind, rain, snow, ice, hail, dew, rodents, birds and other animals, dust, sand, moss, and other living organisms. Reflectivity of a concentrator is sensitive to damage, tarnishing, and dirt buildup since only directly reflected sunlight, not scattered sunlight, is effectively focused.

Glass mirrors are used in some concentrated systems, because of an ability to maintain good optical properties over long design lives (e.g. 30 years) of concentrated solar systems. Glass is relatively fragile and vulnerable to hail and other forms of damage unless it is suitably thick, e.g. 4-5 mm for relatively larger mirrors. In a 400 square foot concentrating dish the thickness results in a weight of close to 1000 lbs or about nine kg per square meter of concentrator area. The mirror is formed in a precise curve, in one dimension for a trough, in two dimensions for a dish, to focus sunlight.

In some concentrated systems, mirror surfaces cease to focus as intended if warped. Thus, the reflector is supported and held in shape by a metal superstructure that is shaped to the curved glass. The superstructure supports and protects the mirror from environmental conditions such as winds of 75 mph or more. The protection from winds adds an additional 10,000 lbs of load beyond the 1000 lb weight of the mirror, resulting in complex construction requiring roughly 20 kg of structural steel for every square meter of mirror area in a dish system.

In some concentrated systems, concentrator tracking motors move the 30 kg per square meter weight of the concentrator, and also overcome force of wind that exceeds an additional 300 kg per square meter. The motors are exposed to environmental elements (such as, dirt, dust, moisture, etc).

In some concentrated systems, troughs are spaced relatively far apart on (e.g. level) ground to avoid shading each other. Avoiding shading is important because the trough mirror is relatively expensive and so having any mirror shaded (and unproductive) is costly. Few approaches exceed ground coverage of 33% since that spacing avoids shading in winter (for an east/west orientation) or early/late in the day (for a north/south orientation). Some east/west orientations (e.g. with 33% ground coverage), have essentially no shading of any trough surface by another at any time during the day or year, capture almost all incident light within a trough array boundary during the winter (when the troughs are held vertical), but capture only about ⅓ of incident light within the trough array boundary during the summer (when the troughs are held horizontal).

Troughs are placeable with length running north/south or east/west. If placed running north/south, then they are rotated during the day to track the daily movement of the sun and keep incident light focused on the receiver. In the morning, the trough is aimed to the east at the rising sun, at noon it is aimed up at the noonday sun, and in the evening it is aimed to the west at the setting sun. North/south troughs do not track seasonal variation in sun position. Instead, as the sun moves lower in the sky (toward the horizon of the equator) during the winter, light strikes the trough and reflects up the trough (away from the equator) to the receiver. In some instances, if troughs are oriented east/west, then they are rotated as the seasons progress to aim at the sun. During the summer the trough is held somewhat horizontal, aimed more or less straight up at the summer sun. During the winter the trough is held somewhat vertical, aimed toward the sun that is lower in the sky in the direction of the equator. In some instances, an east/west trough does not track the daily motion of the sun. Instead, when light comes from the east in the morning, it reflects off the trough and travels further west until it hits the receiver. Similarly, in the evening, the light hits the trough and travels further east down the trough until it hits the receiver.

Synopsis

The invention may be implemented in numerous ways, including as a process, an article of manufacture, an apparatus, a system, and a composition of matter. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. As is discussed in more detail in the Conclusions, the invention encompasses all possible modifications and variations within the scope of the issued claims.

BRIEF DESCRIPTION OF DRAWINGS

FIG. 2b illustrates a cross-section view of a bilaterally symmetric trough with various styles of unilateral extensions.

FIG. 3a illustrates a cross-section view of paths of selected incident light hitting a bilaterally symmetric trough with a unilateral extension and reflecting onto a secondary reflector and a solar receiver.

FIG. 3b illustrates a cross-section view of a solar receiver, a solar receiver insulator, and an integrated secondary reflector, and also illustrates paths of selected light rays.

FIGS. 8a and 8b illustrate views of selected details of an embodiment of a solar receiver, solar receiver insulation, and an integrated secondary reflector, and further illustrate some paths of incident light to the secondary reflector and the solar receiver.

FIGS. 11a and 11b respectively illustrate efficiency as measured by position of a shade line in an aperture and by percent of shading respectively for a bilaterally symmetric trough and a trough with a shortened focal length and a unilateral extension.

DETAILED DESCRIPTION

Figure 1:
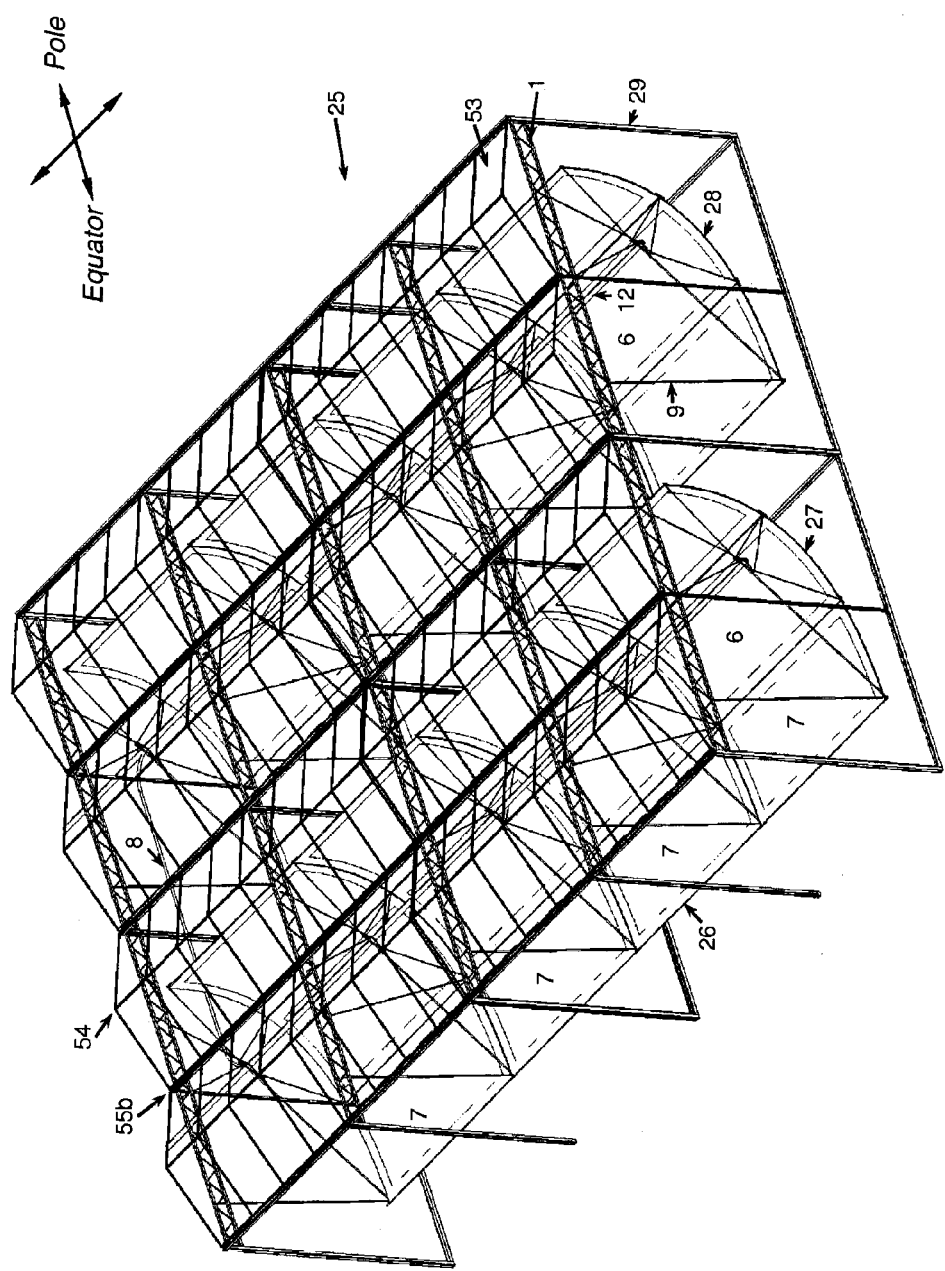
FIG. 1 illustrates a perspective view of selected details of a portion of an embodiment of an enclosing greenhouse and an enclosed concentrated solar energy system utilizing a parabolic trough with a unilateral extension.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In some circumstances, techniques described herein enable cost reduction of concentrated solar power systems. In various embodiments, collection (concentration and conversion of solar energy) is separated from protection. A protective transparent exoskeleton (such as a glasshouse or a greenhouse) surrounds and/or encloses collecting elements (or alternatively the collecting elements are placed in the exoskeleton), enabling the collecting elements (mirrors, lenses, etc) to be less robust than otherwise required. By separating collecting and protecting functions, and leveraging off-the-shelf technology (e.g. highly engineered, cost effective, and proven greenhouse technology, such as glass growers greenhouse technology) for the protection function, in some circumstances a reduction in cost and complexity of a system (such as mirrors/lenses, support structure, foundations, tracking mechanisms, etc.) is enabled with a relatively minimal impact on overall performance. The glasshouse is relatively low to the ground with little wind force bearing surfaces, and is designed to withstand wind and weather with a relatively minimal structural skeleton. Because the glasshouse reduces wind forces acting on the collector and receiver elements, the mirrors or lenses used for collection and concentration inside the exoskeletal protection of the glasshouse are enabled to be lightweight, in some embodiments, to a point of seeming flimsy, and thus are relatively less costly to construct, transport, support and aim, and have little or no weatherization costs. Note that within this disclosure, the terms glasshouse and greenhouse are used interchangeably, and are not meant to necessarily imply any sort of horticultural activity.

The protected embodiment techniques enable reflectors built from lighter materials with simpler and lighter frames since wind, weather, and UV light are reduced inside a glasshouse enclosure. Foundation, suspension, and tracking mechanisms for receivers and concentrators are enabled to be simpler, lighter, and less expensive.

Some embodiments of a concentrated solar system inside a glasshouse have an array of relatively large 2-D-freedomed, 1-D-solar-tracking parabolic troughs suspended from fixed roof locations.

A glasshouse, such as a commercial greenhouse, efficiently supports flat glass planes. Supporting framework of straight metal sections brace each other and attach to the ground in multiple places. Some glasshouses designed to withstand the same weather conditions as an external parabolic dish require less than half as much structural steel (less than 10 kg) per square meter of concentrator, compared to an external parabolic dish. Total weight, including 4-5 mm glass, is less than 20 kg per square meter of concentrator, for the glasshouse.

According to various embodiments, concentrators are made entirely or partially of thin-gauge aluminum foil, reflective film, or other relatively reflective and lightweight materials. Some of the materials have higher reflectivity than glass mirrors. Concentrators, in some embodiments, are foam core combined with reflective material, enabling concentrators weighing less than one kg per square meter. Lightweight construction, in some usage scenarios, reduces one or more of costs associated with production, transportation, and installation of concentrators. Total weight for some enclosed concentrated solar energy embodiments (including exoskeleton and protected collector) is less than 20 kg per square meter of concentrator.

The glasshouse structure is primarily fixed and immobile, and tracking systems control and aim the less than one kg per square meter concentrators inside the structure in an environment having relatively small wind forces.

In some embodiments, a commercial greenhouse is a suitable enclosure as taught by the techniques described herein. Growers have determined that for many types of plants, 1% less light reaching plants equals 1% less crop growth and hence profit. Greenhouse designs are optimized to reduce cost, structural shading, glass reflective losses, and glass transmission losses. In some usage scenarios, the structural shading, glass reflective losses, and glass transmission losses cause a majority of lost sunlight. The Dutch Venlo design is relatively efficient at reducing the losses. Options available in commercial greenhouses include low-shading structural design, anti-reflective glass coatings (to reduce reflective losses), and low-iron glass (to reduce transmissive losses).

In some embodiments, sunlight losses due to a glasshouse enclosure are less than 20% at 33 degrees latitude without an anti-reflective coated glass. In some embodiments using anti-reflective coated glass, losses are 13%. In some embodiments, techniques described herein improve salvage value of a system in one or more of obsolescence, abandonment, and destruction and/or damage due to storm, ice, corrosion, and earthquake events.

A commercial greenhouse has multiple uses and has, in some embodiments and/or usage scenarios, a ready sale market for a greenhouse sold in place or for relocation. In some embodiments, a greenhouse enclosure of a concentrated solar energy system is a significant portion of the system cost. Resale value of the greenhouse, in some usage scenarios, lowers overall risk of a solar energy project and/or reduces financing costs.

In some embodiments, long, continuous, fixed receivers are advantaged over other systems to avoid complex and expensive mechanisms such as moving fluid joints or hoses to connect the thermal medium system. In some embodiments and/or usage scenarios, selected components (such as receivers or pipes) that are fixed during a tracking mode of operation are permitted to move or are moved due to expansion and contraction of materials or for cleaning during a maintenance mode of operation.

Thermal conduction and convection increase with wind speed, thus reducing efficiency of solar thermal receivers. In some non-enclosed concentrated system approaches, solar energy receivers are protected from environmental effects including heat loss and physical damage by an at least partially transparent protective enclosure for each receiver. In some enclosed embodiments, thermal energy receivers are enabled to minimize heat loss without using an enclosure for each receiver.

In some embodiments, a greenhouse enclosure is a fixed cost and a significant portion of overall system cost. Thus it is beneficial to have as much of the light that comes into the greenhouse hit a mirror and reflect to a receiver as feasible during all seasons and all times of day. A technique of tightly packing troughs, covering as much ground as feasible, is beneficial when implementing a CSP system inside a greenhouse. In addition to more effectively using the space enclosed by the greenhouse, such a technique also more effectively uses land area to produce solar heat and power. Such a technique is enabled in part by concentrators inside a greenhouse that are relatively inexpensive since the concentrators are not subject to significant environmental insults such as wind, rain, and dust.

In some embodiments, such as some embodiments operating at high temperatures (e.g. above 300 degrees Celsius), heat loss from receivers represents a significant overall system cost. Thus, it is desirable to minimize receiver size to minimize surface area of the receiver and thus to minimize heat losses from the receiver. In some embodiments, a shorter focal length parabolic trough with a smaller aperture enables use of a smaller receiver, since smaller lengths and angles reduce effects of manufacturing tolerances and of arc size of the sun.

One technique to tightly pack troughs to capture more incident light within an enclosure, is to use more troughs and place them closer together to fill up the enclosed space. This results in more total receiver length (since there are more troughs) and so more total thermal loss and pumping cost. Such a system gathers more light in summer when the sun is overhead and the troughs are in a horizontal position not shading each other, but collects no more light in winter, due to shading, than a system with fewer troughs spaced far apart. Another technique is to use longer focal length troughs with a wider aperture, again placed closer together. This preserves total receiver length but uses larger receiver pipe to capture light from a longer focal length mirrors and the larger aperture, thus increasing thermal loss or imposes tighter tolerance on a concentrator to maintain focus, thus increasing cost and complexity. Some of the embodiments described herein, when deployed in an east/west orientation and tracking seasonal motion of the sun, use an asymmetric trough design wherein one side of a short focal length trough is extended further than the other side in an extension area of the trough. In the winter, when the troughs are angled up to face the winter sun, the extension areas are in shade and gather no energy, but base portions of the short focal length troughs are in sun, and intercept almost all available light. In the summer, when the troughs are more horizontal to face the high in the sky sun, the short focal length center of the troughs enable capture of much of the light and reflect that light to a small diameter receiver. The extension is now illuminated as well, and captures the rest of the light that would otherwise be lost without the extension.

The extension section of the trough has a longer distance to the receiver and so will not naturally focus as well. In the a relatively simple design, efficiency of the extension is allowed to be lower than that of a remainder of a trough (such as 70%) since the extension is used only for a fraction of the year and for a fraction of incident light. Alternately, a small secondary reflector is used to capture light reflected from the extension that misses the receiver, and reflect that light back to the receiver. A secondary reflector about two times the diameter of the receiver enables capture of almost all the light from the extension. A secondary reflector enables a receiver of a same size as without the extension and without increasing thermal losses. In some embodiments, a partial insulator and convection shield are integrated with the secondary reflector to reduce the thermal losses from the receiver.

In some embodiments of an asymmetric trough, e.g. having a larger aperture than a base symmetric portion of the trough, greenhouse height is increased to make room for an extension to clear the ground when the trough is vertical, thus increasing the cost, edge effect shading, and design and/or manufacturing complexity of the greenhouse. A movable hinge connecting the trough extension to the base portion of the trough enables a reduction of the increase in the greenhouse height. During the winter, the trough is raised to face the sun and the extension is moved on its hinge to remain essentially horizontal to the ground. Thus, the height of the trough with a hinged extension during the winter is limited by the base portion of the trough and not increased by the extension. During the summer, the trough is held more nearly horizontal and the extension is returned to be a continuous extension of a (parabolic shape, e.g.) of the asymmetric trough.

Some embodiments orient troughs on a north/south axis and rotate the troughs to track daily motion of the sun. In such embodiments, a movably hinged extension on each side of the trough (a "top" extension and a "bottom" extension) are optionally used. During morning, a trough is held facing east toward the sun. The top extension is flipped behind the trough to reduce or eliminate shading of a longitudinally adjacent trough, while the bottom extension is held horizontal to the ground to prevent hitting the ground. Only the base portion of the trough is illuminated. At noon, the trough is horizontal to the ground, pointing at the sun high in the sky. The two extensions are in respective operating positions, providing an extended trough of a larger effective aperture. In evening, the trough is held vertical facing west, with the extensions held similarly to the morning. Thus at all times of day, most incident light (such as within a greenhouse) is captured by a concentrator.

Integration of Receiver and Greenhouse Structure

In some embodiments, a receiver and concentrator are suspended from superstructure of an enclosing greenhouse, enabling use of substantial support infrastructure of structure of the greenhouse. Lightweight receivers and troughs, hung from the greenhouse (e.g. roof structure, trusses, and/or end posts), are held in place and aimed with relatively small members that exert force mostly in tension, thus avoiding use of relatively larger members compared to structures held in place and moved with members in compression and subject to bending. The receiver is suspended at a fixed position relative to the greenhouse and the concentrator is suspended with its focal line held on the receiver but able to rotate around the receiver to track the daily and/or seasonal motion of the sun.

In some embodiments, a receiver pipe expands (such as by about ½ percent) when heated by thermal transport fluid transported in the receiver pipe. In some usage scenarios, a 500 foot pipe expands about two feet. In some embodiments, the receiver pipe is held in a fixed position at a "fixed" end of the pipe at one end of the greenhouse, and enabled, by hangers, to expand and contract along its length toward the other "non-fixed" end of the pipe. The hangers suspend the receiver pipe from superstructure of the greenhouse, and are designed so that when the receiver pipe is hot and at maximum extension (while operating), each hanger is vertical and the receiver pipe is horizontal. When the receiver pipe is cool and contracts (while not operating), each hanger bottom is pulled slightly toward the fixed end of the receiver pipe and the receiver pipe is pulled slightly higher at the non-fixed end. When the receiver pipe is cool, each successive hanger is slight pulled in such that the hanger at the non-fixed end of the receiver pipe is pulled in (e.g. as much as two feet). For example, with approximately six foot hangers, the (cool) receiver pipe rises less than a foot relative to the other end of the receiver pipe. The concentrators are at a fixed distance and rise fall with the receiver pipe, thus preserving focus.

Design of Hanger, Rotating Joint and Bearing

In some embodiments, a hanger with a rotating joint is held in place suspended from roof superstructure of a greenhouse. A receiver tube is rigidly connected to the hanger, thus supporting the receiver tube. The rotating joint is connected to the hanger with a bearing enabling the joint to rotate around the receiver tube. A trough is suspended from the rotating joint. All the weight of the joint and the trough is carried by the rotating joint, through a bearing and to the hanger and then up to the roof superstructure. The rotating joint is enabled to rotate for small adjustments during the day, through about ½ turn from winter to summer, and another ½ turn back from summer to winter. In some usage scenarios, during an entire lifetime of the joint, it rotates the equivalent of no more than 100 revolutions and never needs to rotate more than about 1rpm. The bearing and the rotating joint are designed to avoid shading the receiver tube and to withstand high temperatures (e.g. hundreds of degrees C.) since the bearing and the joint are necessarily in close thermal proximity to a high temperature thermal medium and the receiver tube.

Concentrated Solar Energy System

Industrial scale concentrated solar power systems, in some embodiments, cover multiple acres of land, with large-scale systems practical in the hundreds of acres. FIG. 1 illustrates a perspective view of selected details of an embodiment of an enclosing greenhouse and an enclosed concentrated solar energy system for a small portion of a system. Greenhouse 25 has low internal shading and low cost. According to various embodiments, the greenhouses are less than an acre to hundreds of acres in size. Suitable commercial greenhouses are available with short lead times from various vendors. Additionally, in some usage scenarios, there is a market for used greenhouses, enabling relatively easier financing of large-scale concentrated solar energy projects, such as described herein. Elements of the greenhouse include a roof system with multiple peaks and gutters. The roof system is enabled to drain water efficiently from the roof structure, to keep incident angles of sunlight relatively close to directly normal to transparent roof material to reduce reflection, and to keep roof support members in compression. Sidewalls of the greenhouse further enclose interior space of the greenhouse and have transparent covering where sunlight is incident thereon and are optionally of any appropriate material where little sunlight is incident. The greenhouse structure is enabled to keep most wind, rain, and other environmental elements from the interior, and is optionally not entirely weather tight. An optional fan driven overpressure filtration system (not illustrated) optionally provides relatively clean pressurized air to the interior to further inhibit infiltration of dust and other elements to the interior. The lack (or reduction) of dust reduces or eliminates a need to clean concentrators (such as concentrators 27 and 28), reducing operating costs and enabling use of less robust and less scratch resistant reflective concentrator materials, in some usage scenarios and/or embodiments. In some operating conditions, concentrators shade each other as illustrated by front concentrator 27 in front of and shading concentrator rear 28. In some embodiments, concentrator troughs are much greater in length than width, with an aspect ratio of between 10-1 and 33-1 rather than the approximately 3-1 aspect ratio illustrated. In some embodiments, many troughs are enclosed in a single greenhouse with one front trough 27 and all the rest rear troughs such as 28. In some embodiments, the troughs are aligned east/west, with troughs facing the equator as illustrated, and track seasonal movement of the sun. In some embodiments, the troughs are aligned north/south (not illustrated).

In some embodiments, all elements of the concentrated solar energy system are located within a protected interior of a greenhouse. Greenhouse transparent cover material 53 is glass or any material generally transparent to sunlight. The transparent cover optionally includes an ultra violet (UV) blocking coating or film to enable use of plastics inside the greenhouse (such as reflective plastic mirror films for the concentrator surfaces) that would otherwise break down relatively rapidly. In some embodiments, solar receivers, such as implemented in part by receiver pipe 12, are held at somewhat fixed positions during sunlight collecting operation to reduce a need for flexible joints carrying a thermal medium. The solar receivers are interconnected through a series of thermally insulated pipes (such as pipe 8). In a concentrated solar thermal (CST) system, heated thermal medium is a primary output of the system and is fed to an industrial process. In a direct electric system, such as a concentrated photo voltaic (CPV) system, a thermal medium optionally provides cooling to PV cells or other aspects of the receiver. Excess heat in the thermal medium of a CPV system is optionally used in an industrial process. Measurement and control wires, power for motors, and various cabling is routed with the thermal medium pipes, in some CST and CPV embodiments.

In FIG. 1, line-focus solar receivers are illustrated and are suspended from receiver pipes 12 that are in turn suspended from the roof of the enclosing greenhouse. Line-focus solar concentrators are suspended from associated solar receivers so that the focal point of the concentrator is held relatively fixed on the receiver while the concentrator body remains free to rotate around the receiver (in one degree of freedom) to track daily and seasonal motions of the sun. The arrangement of relatively fixed receivers and concentrators that rotate around the receivers to track the sun is enabled, at least in part, by low weight of the concentrators and absence of wind forces on the concentrators.

Some trough solar concentrators (such as solar concentrator 27), have a symmetric primary portion, e.g. built of symmetric facets (such as base trough section 6), and a secondary section, e.g. built of one or more extension facets (such as extended trough section 7). When held in a vertical position to aim at winter sun, the extension section is at bottom 26 of trough.

Shape of Trough and Definitions of Terms and Formula

Figure 2A:
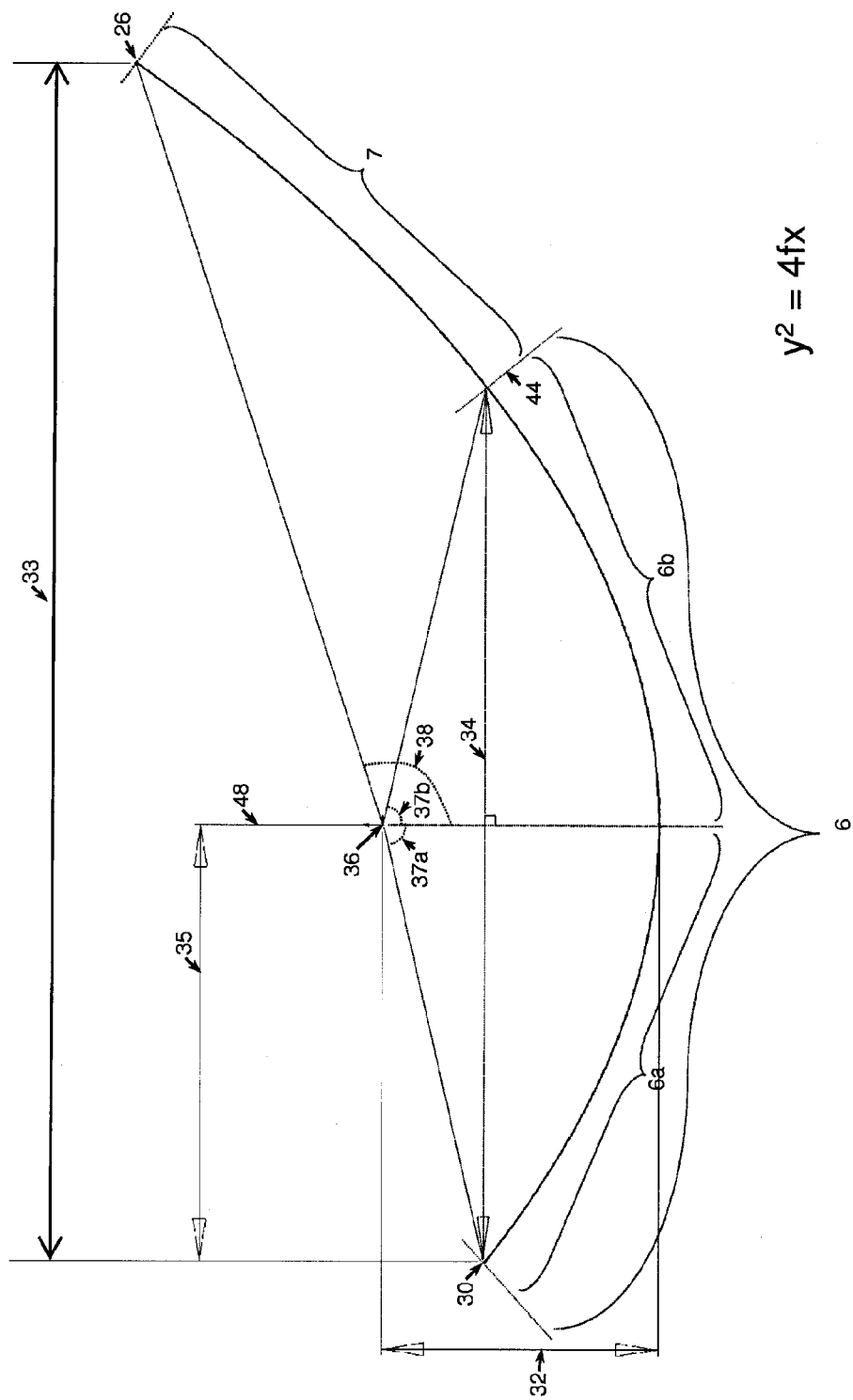
FIG. 2a illustrates a cross-section view of a bilaterally symmetric trough with a symmetric portion and a unilateral extension collectively having one continuous shape.

FIG. 2a illustrates a shape of a parabolic trough with an extension, such as an embodiment of an asymmetric (parabolic) trough. The shape of the parabolic trough is defined by the formula $y^2=4fx$. With example values described following, an example parabola is defined by the formula $y^2=5.8x$, where $-2.29<x<4$. A primary symmetric portion includes two symmetric base trough sections 6a and 6b referred to and illustrated collectively as base trough section 6, and also sometimes referred to as (symmetric) base portion (of the trough). A secondary extended portion includes extended trough section 7, and is, in some embodiments, a unilateral extension of the parabolic shape. Bottom of trough 26 is the edge of the trough that is closest to the ground when the trough is held vertical to face the sun low in the sky. Top of trough 30 is the edge of the trough that is furthest from the ground when the trough is held vertical. In some embodiments, bottom of trough 26 is the edge of extended trough section 7, and is further from the ground when the trough is horizontal, pointed at the sun high in the sky (as illustrated in FIG. 2a, given an orientation of the trough such that construction line 34 is essentially horizontal to the ground). Trough focal length, illustrated by construction line 32 (e.g. having a value of 1.45 meters), is represented by the symbol f. A symmetric trough has an aperture (referred to as a base aperture in a trough with an extension), defined by a construction line between its two edges, such as illustrated by construction line 34 across the symmetric portion and ending at construction line 44, denoting intersection of the primary and the secondary portions of the trough. Construction line 35 represents a half-portion of construction line 34 (e.g. having a value of 2.29 meters). Construction line 33 indicates an extended aperture (e.g. having a value of 6.29 meters) of the asymmetric trough (referred to simply as the aperture where clear from context), including base trough section 6 and extended trough section 7. In some embodiments, extended trough section 7 is optionally movably connected to base trough section 6, is optionally enabled to change shape and/or is optionally enabled to change focus at an intersection defined by construction line 44. Construction line 48 defines an axis of symmetry of the symmetric base portion of the trough and runs from the intersection of base trough sections 6a and 6b through focal point 36. Angles 37a and 37b are base rim angles (sometimes referred to as the base rim angle for clarity) of the symmetric portion of the trough. Angle 38 is the extended rim angle of the extended portion.

FIG. 2b illustrates various techniques for a secondary extension. In various embodiments, extension 45 is a continuation of a parabolic shape of a primary portion, shares a focal point with the primary portion, and is connected at an intersection defined by construction line 44 either fixedly or by a movable hinge. In various embodiments, extension 46 is an alternate shape, has a focal point that is distinct from the primary portion, and is connected at an intersection defined by construction line 44 either fixedly or by a movable hinge. In various embodiments, extension 47 is a flat shape, has a focal point that is distinct from the primary portion, and is connected at an intersection defined by construction line 44 either fixedly or by a movable hinge.

Incident Sunlight Transmission

In some embodiments, solar concentrators as large as will fit inside large standard commercial greenhouses (e.g. roughly in a six meter aperture range), are used. Each solar concentrator is associated with a drive mechanism and a solar receiver, thus increasing concentrator size (correspondingly reducing how many are used in a particular area), and reducing the number of the drive mechanisms and/or the solar receivers, reducing cost overall. In various embodiments, one or more concentrators share a same drive mechanism.

Irradiance characterizes power of incident electromagnetic radiation (such as sunlight) at a surface, per unit area. Some sunlight losses caused by the greenhouse enclosure glass and structural shading are determined by comparing direct normal sunlight received inside the greenhouse enclosure (interior) with unimpeded direct normal sunlight received outside the greenhouse enclosure (exterior). In absolute terms, irradiance loss is highest at midday; considered relatively, the irradiance loss is highest in mornings and evenings. FIGS. 3A and 3B illustrate selected details of an embodiment of a solar concentrator and solar receiver.

FIG. 3a illustrates paths of incident radiation 41 that has come through the greenhouse enclosure and is reflected off base trough section 6 and extended trough section 7. Reflected light 42 from base trough section 6 is focused onto receiver pipe 12. In some embodiments, receiver pipe 12 diameter is sized so that most (such as 95% or more) of reflected light from base trough section 6 hits receiver pipe 12, taking into account angle of incident radiation (due to the extent of the sun) and manufacturing tolerances. In some embodiments, insulating jacket 20 is used to reduce heat loss from receiver pipe 12. In some embodiments, reflected light 43, 49, and 50 from extended trough section 7 is less well focused than reflected light 42 from the base trough sections, such as with 95% of reflected light subtending twice the area at the focal point as light reflected from the base trough sections due to the longer distances from extended trough section 7 to receiver pipe 12.

FIG. 3b illustrates in more detail a design of receiver pipe 12, insulating jacket 20, and integrated secondary receiver 21. In some embodiments, secondary reflector 21 is implemented with a reflective coating applied to a portion of insulating jacket 20. In some embodiments, secondary reflector 21 is used to extended capture area of incident light from a secondary portion without increasing size of receiver pipe 12. Secondary reflector 21 reflects light incident from extended trough section 7 onto receiver pipe 12. In some embodiments, secondary reflector 21 is approximately equal in cross section size as receiver pipe 12 and is positioned above receiver pipe 12 as seen from extended trough section 7. In some embodiments, extended trough section 7 is designed so that its focal point is directly between receiver pipe 12 and secondary reflector 21 so that half the light reflected from extended trough section 7 directly hits receiver pipe 12 and half the light hits secondary reflector 21 and is then reflected to receiver pipe 12. Incident light 49 to top of secondary reflector 21 and 43 to bottom of secondary reflector 21 reflect at various angles depending on the angle of incidence in paths such as paths 51 to receiver pipe 12.

Selected Greenhouse Details

In some embodiments, a greenhouse includes roof peaks (such as roof peak 54 of FIG. 4a) that in combination with included roof gutters (such as roof gutter 55a) are enabled to drain water over a large space and to angle transparent roof material relatively close to direct normal to incident sunlight in summer and in winter. A roof system with peaks and gutters is referred to as a "ridge and furrow" style roof, in some usage scenarios, and in some embodiments, is a form of a "gutter-connected" roof system. The greenhouse includes support columns (such as support column 29). Some of the support columns are arranged around the periphery of the greenhouse and others of the support columns are arranged within the greenhouse. In some embodiments, the greenhouse includes support columns at every roof gutter (such as support columns 57a, and 57b located at roof gutters 55a, and 55b, respectively, of FIG. 4A). In alternate embodiments, every other support column is omitted (such as support column 57a being omitted) and trusses (such as truss 1) are horizontal lattice girders. Roof gutters without support columns are floating gutters (e.g. roof gutter 55a). Some of the embodiments that omit every other support column are implemented with a Venlo style greenhouse. Various embodiments suspend pipes 8 and receiver pipes 12 from trusses 1 or horizontal lattice girders. Various embodiments suspend pipes from trusses or horizontal lattice girders and further suspend receivers from pipes.

Selected Mounting and Control Mechanism Details

Figure 4A:
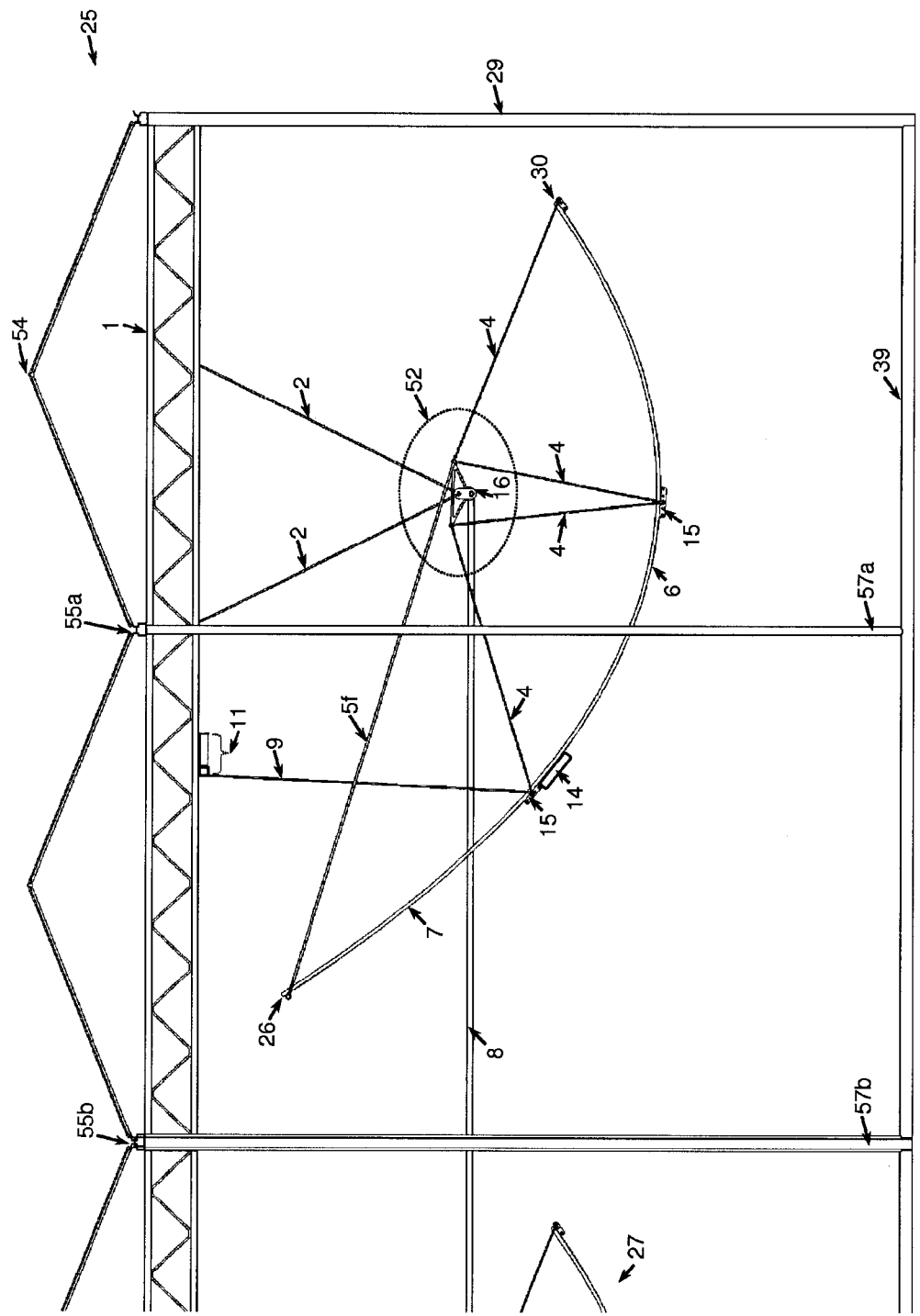
FIGS. 4a and 4b respectively illustrate selected details of an embodiment of a greenhouse enclosure with enclosed solar concentrators utilizing a fixed unilateral extension and solar receivers in respective incident sunlight contexts: high angle (summer) and low angle (winter).
Figure 4B:
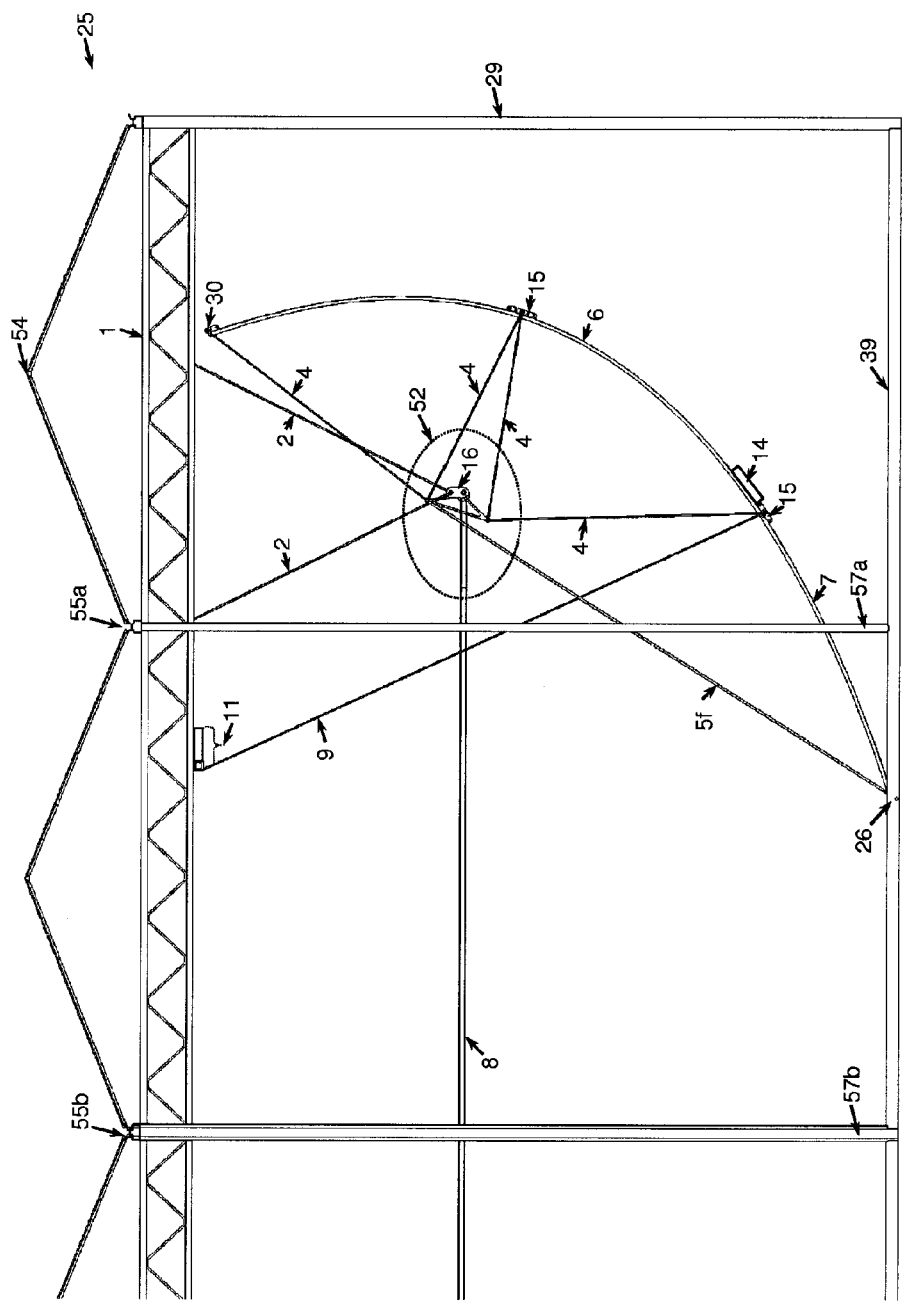

FIGS. 4a and 4b illustrate a parabolic trough with a fixed unilateral extension including extended trough section 7 enclosed in greenhouse 25 held in a horizontal (summer) position and a vertical (winter) position respectively. A rotating suspension mechanism and a receiver pipe are outlined by construction line 52 and illustrated in more detail in FIGS. 6a and 6b. Suspension hanger 16 is suspended from greenhouse truss 1 by suspension members 2. Base trough section 6 is suspended from suspension hanger 16 by fixed base trough suspension members 4 and fixed extension suspension member 5f that hold the trough at a fixed distance from the receiver pipe, with a focal line of the trough on (or concentric with) the receiver pipe. Suspension members 4 are connected to base trough section 6 and extended trough section 7 with trough section connectors 15. Insulated pipe 8 connects the trough receiver pipe to a next trough receiver pipe to complete a thermal fluid circuit.

Top of trough 30 and bottom of trough 26 in a maximum vertical winter position determine a height requirement for a greenhouse such that bottom of trough 26 does not hit floor of greenhouse 39 and top of trough 30 does not interfere with truss 1.

In some embodiments, counterweight 14 is used to balance a trough so that its resting position is at least as vertical as the most vertical position used for solar energy collecting operation, enabling positioning the trough through all its operating positions by positioning member 9 that is shortened or lengthened as required by winch 11. In some embodiments, all support and positioning members 2, 4, 5f and 9 are designed to operate only in tension. In some embodiments, some or all of support and positioning members 2, 4, 5f and 9 are optionally flexible members such as wire, monofilament, or rigid members with low strength under compression and torsion. In some embodiments, gear ratio and torque requirements of winch 11 are minimized by connecting positioning member 9 far from an axis of rotation of the trough. In some embodiments, positioning errors due to gear lash and due to gear and other member manufacturing tolerances, are minimized because positioning member 9 is always held in tension when the trough is operational, and gravity is sufficient as a counterforce in positioning the trough since wind is minimized inside enclosure 25.

Selected Details of a Movable Hinged Extension

Figure 5A:
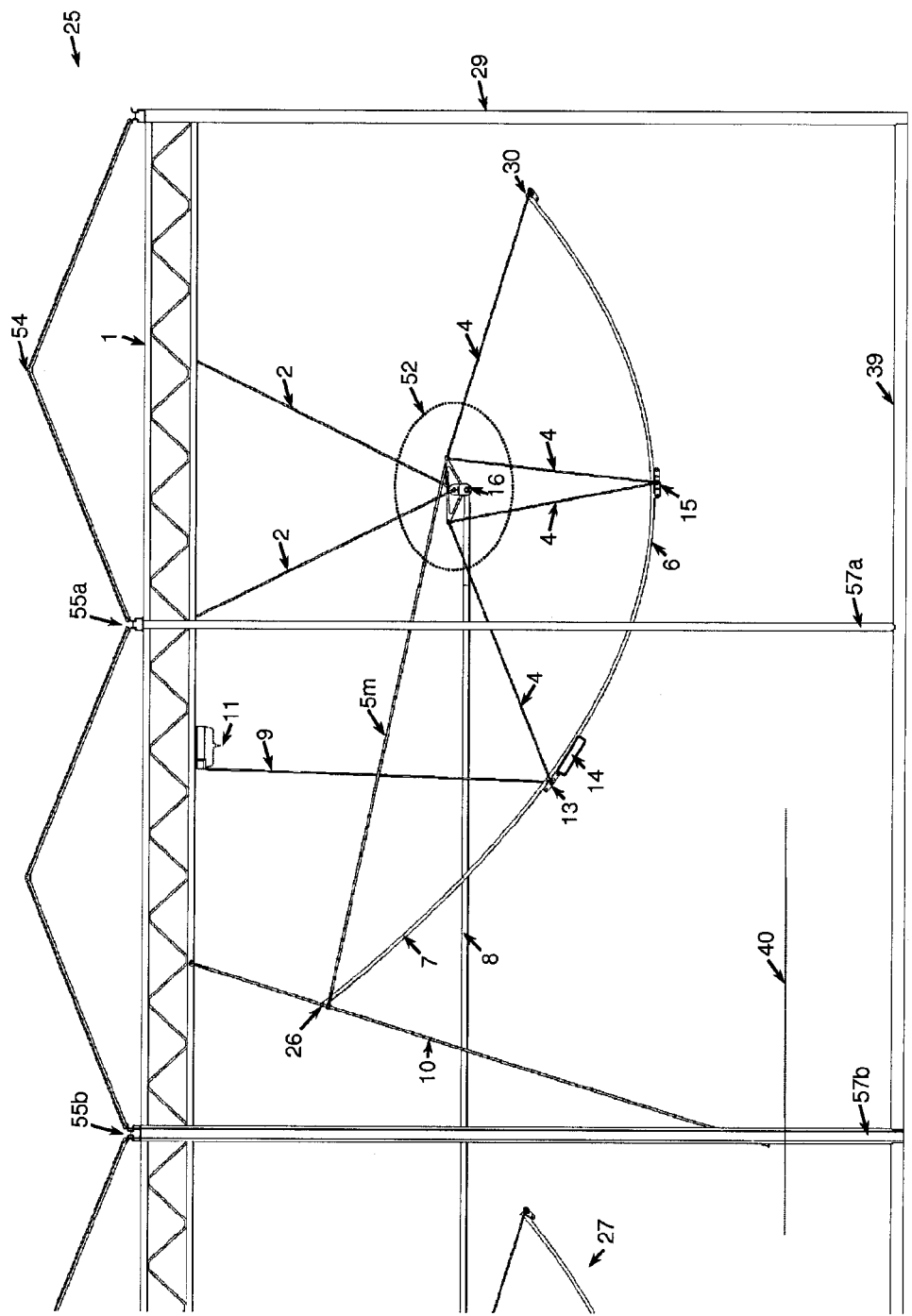
FIGS. 5a and 5b respectively illustrate selected details of an embodiment of a greenhouse enclosure with enclosed solar concentrators utilizing a movable unilateral extension and solar receivers in respective incident sunlight contexts: high angle (summer) and low angle (winter).
Figure 5B:
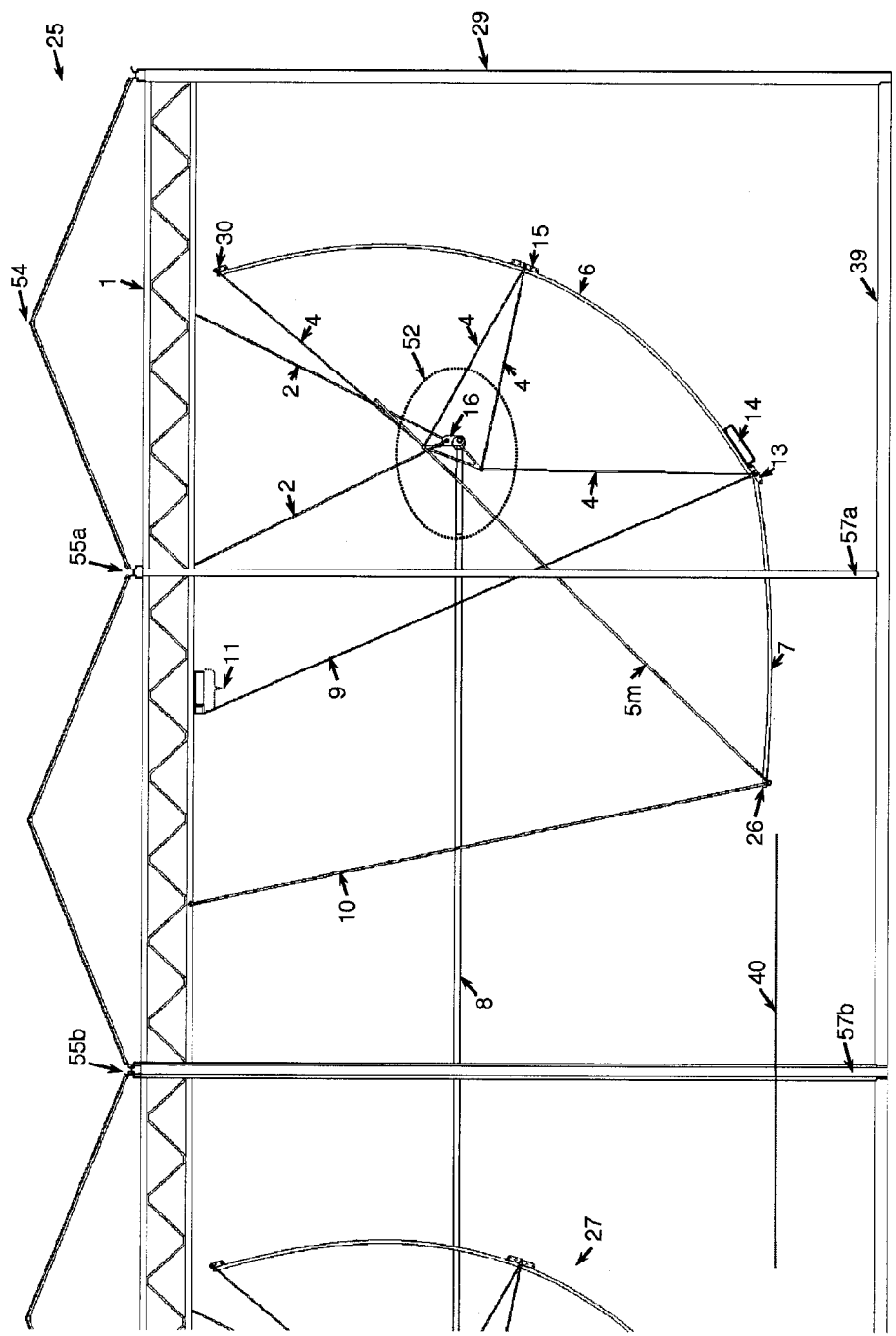

FIGS. 5a and 5b illustrate, respectively, a trough with a movable extension, otherwise similar to, respectively, the trough with the fixed extension illustrated in FIGS. 4a and 4b. In FIGS. 5a and 5b, section connector 15, at the intersection of base trough sections 6 and extended trough section 7, is conceptually replaced with hinged section connector 13. Fixed extension suspension member 5f of FIGS. 4a and 4b, is conceptually replaced by movable extension suspension member 5m of FIGS. 5a and 5b. In some embodiments, movable extension suspension member 5m is a rigid bar fixedly connected to the outside edge of extended trough section 7 and coupled (e.g. via direct mechanical connection or via one or more intermediate mechanical members) to hanger 16 to enable sliding. Extension stop member 10 is fixedly connected to truss 1 and connected to extended trough section 7 to enable sliding. In a summer position illustrated in FIG. 5a (and in any position where the extension is operational) movable extension suspension member 5m slides to a stop at hanger 16, and holds extended trough section 7 in an operating position as an extension of base trough section 6, while extension stop member 10 slides free and does not influence the position of extended trough section 7. In a winter position illustrated in FIG. 5b (and in any position where the extension is stowed and non-operational), movable extension suspension member 5m slides free and does not influence the position of extended trough section 7, while extension stop member 10 slides to a stop at the edge of section 7, and holds extended trough section 7 in its non-operation (stowed) position above floor 39 of greenhouse 25. Construction line 40 illustrates the lowest point touched by any part of the trough mechanism with the movable extension and so the distance between construction line 40 and greenhouse floor 39 represents a reduction in greenhouse height enabled by the movable hinged extension compared to an extension that is not movable (e.g. fixed).

In some embodiments with a movable extension section, counterweight 14 is sized so that the center of gravity of a trough system provides a countervailing force against positioning member 9, when movable extension support member 5m is engaged, as well as when extension stop member 10 is engaged, and is sufficient to counter any forces that in some usage scenarios would otherwise raise bottom of trough 26.

In some embodiments, rigid sliding movable extension support member 5m is implemented with a flexible member (such as wire or monofilament) of a length determined to hold extended trough section 7 in proper operating position when under tension (as held by gravity) and that is slack and exerts no influence on position of extended trough section 7 when extended trough section 7 is held in a stowed position by extension stop member 10.

Figure 6B:
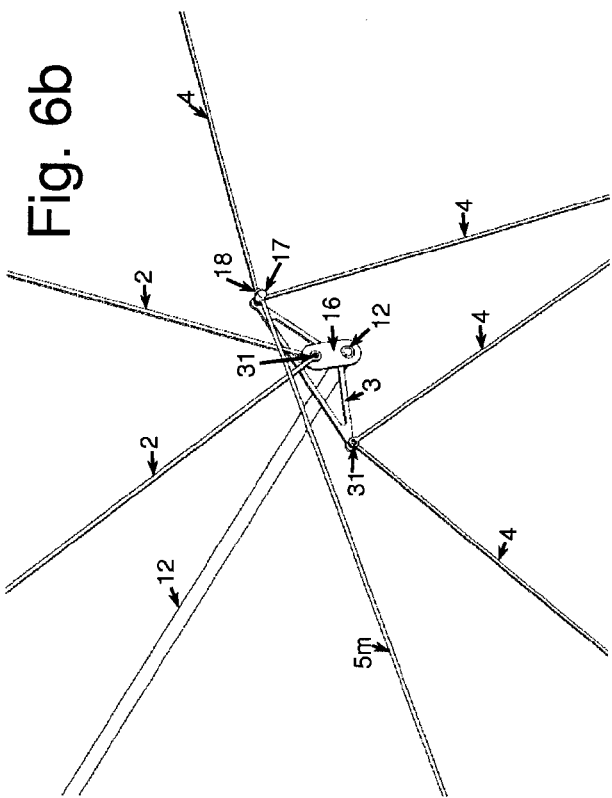
FIGS. 6a and 6b illustrate perspective views of selected details of an embodiment of suspension mechanisms enabled to suspend solar receivers from greenhouse superstructure and suspend solar concentrators with respective focal points fixed on the respective solar receivers.
Figure 6A:
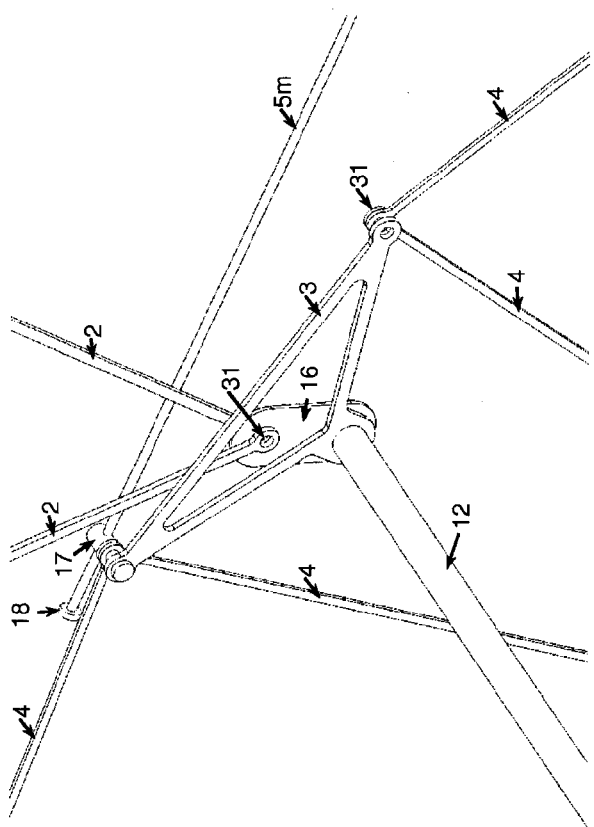

FIGS. 6a and 6b illustrate details of an area outlined on FIGS. 4a, 4b, 5a, and 5b by construction line 52. FIG. 6a is a perspective view from the side of hanger 16 that rotating joint 3 is mounted on, while FIG. 6*b* is a perspective view from the opposite side. A connecting fastener (not illustrated) is used at location 31 to connect hanger suspension members 2 and trough suspension members 4 to hanger 16 and rotating joint 3 respectively. Receiver pipe 12 is suspended and fixedly connected to hanger 16. Movable extension suspension member 5*m* is connected to rotating joint 3 through sliding connector 17 (used for movable hinged extension embodiments). In FIG. 6*a*, movable extension support member 5*m* is in the state where extension support member stop 18 is not engaged with sliding connector 17, and so movable extension support member 5*m* is not influencing the position of the extension trough section. This is a non-operational position of the extension trough section (e.g. during winter or maintenance). In FIG. 6*b*, movable extension support member 5*m* is in the state where extension support member stop 18 is not engaged with sliding connector 17 and so movable extension support member 5*m* is holding the position of extension trough section. This an operational position of the extension trough section (e.g. during summer). In an embodiment with a fixed extension, movable support member 5*m* is held fixed with its stop 18 engaged. In some embodiments, rotating joint 3 is connected to hanger 16 with a bearing (not illustrated in detail), enabling rotating joint 3 to rotate around hanger 16.

Figure 7:
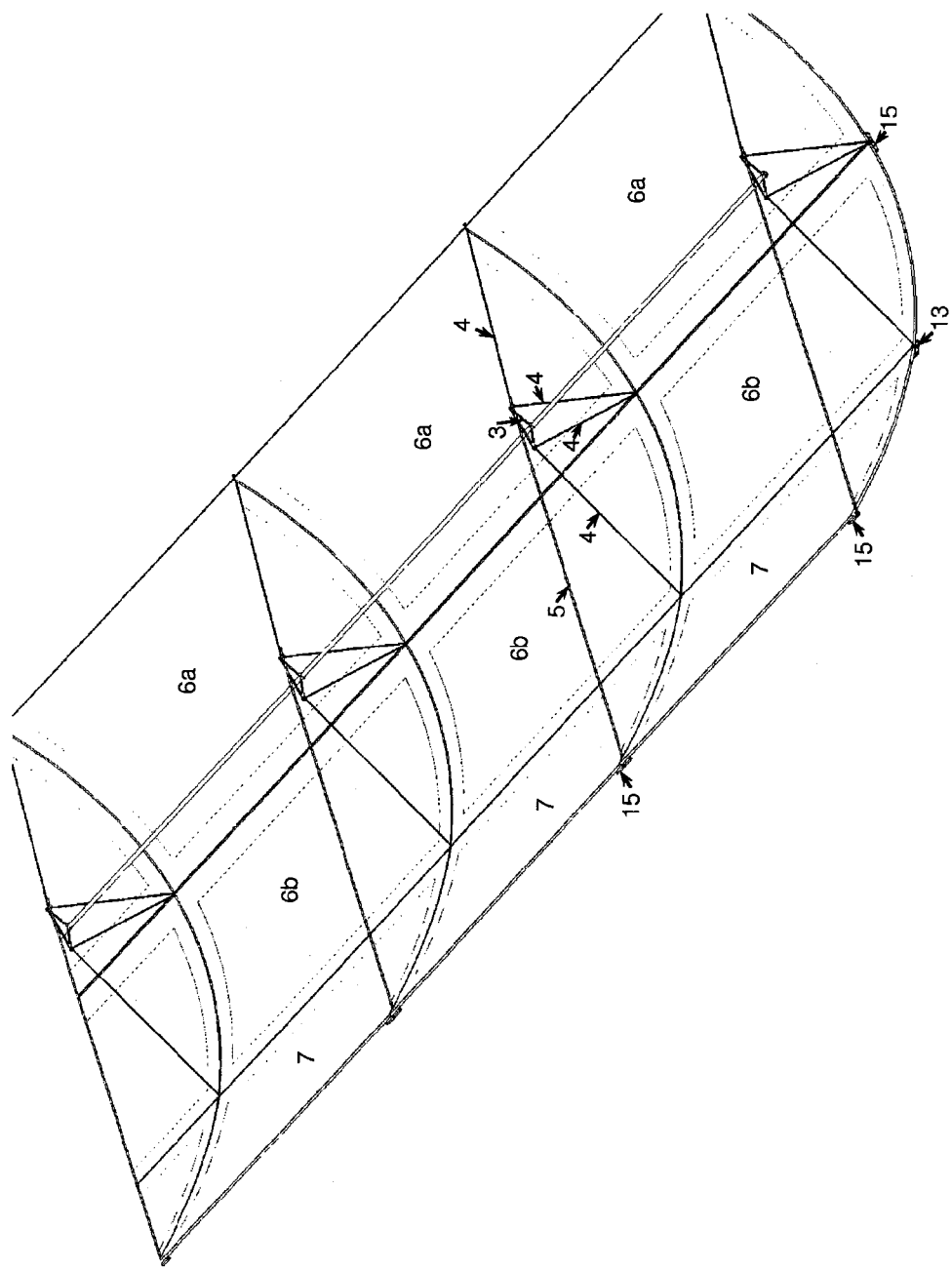
FIG. 7 illustrates a perspective view of selected details of an embodiment of a parabolic trough solar concentrator with a unilateral extension, a solar receiver, and a suspension mechanism that enable the solar concentrator to rotate about the solar receiver.

FIG. 7 illustrates certain details of a parabolic trough with an extension, a receiver pipe, and an associated suspension mechanisms in a context free of other details to make certain details easier to understand. Extension suspension member 5 is representative of embodiments with fixed extension suspension member 5*f* and movable extension suspension member 5*m*, as appropriate.

FIGS. 8*a* and 8*b* illustrate certain details of receiver pipe 12, insulating jacket 20, secondary reflector 21, hanger 16, and various light paths to make certain details easier to understand. Incident light rays (22*i*, 23*i*, and 24*i*) are reflected off of secondary reflector 21 as respective reflected light rays (22*r*, 23*r*, and 24*r*).

In some embodiments, construction and suspension of a trough is accomplished by pinning together various elements, including suspension members 2, 4, and 5, hanger 16, base trough section 6 and extended trough section 7. Each segment of the concentrator is made from pre-formed mirror surfaces having sufficient internal structure to hold shape and curvature without use of other elements, while under the force of gravity and small forces imposed by suspension and positioning. The concentrators are enabled for inside use, protected by a greenhouse, and so are not strong enough to withstand wind force or environmental elements such as rain and dust. Suspension members are either light rigid members or wires. In either case, the suspension members connect to the concentrator surface, joint, hanger, or roof superstructure with pins that are readily insertable for assembly and readily removable for service.

Graphs Comparing Performance of Standard Trough to Trough with Extension

Figure 9B:
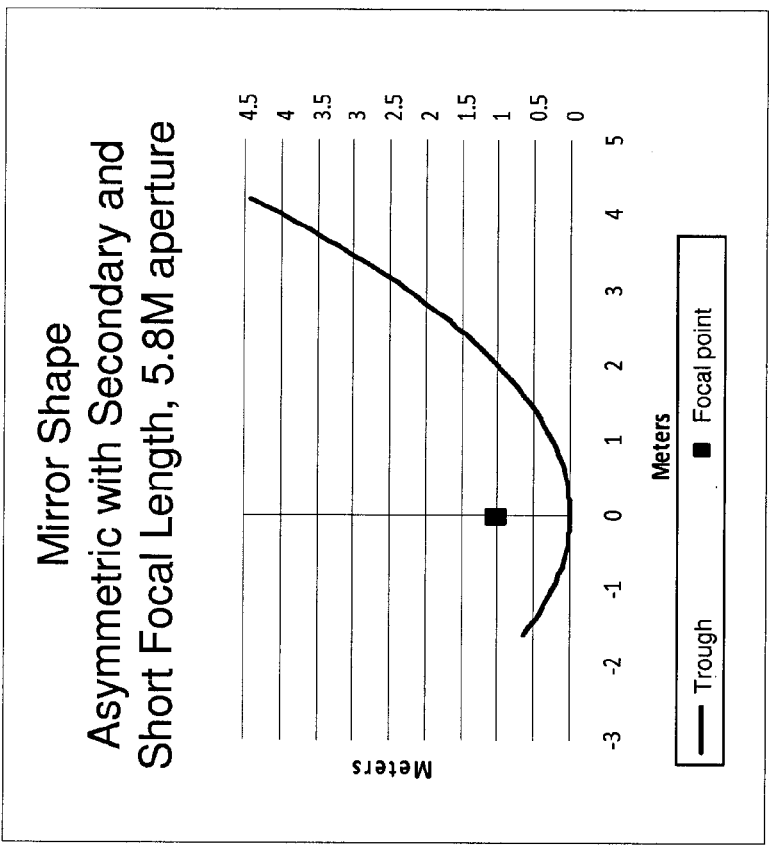
FIGS. 9a and 9b illustrate respective shapes and focal points of troughs of equal aperture, illustrating respectively a bilaterally symmetric trough and a trough with a shortened focal length and a unilateral extension.
Figure 9A:
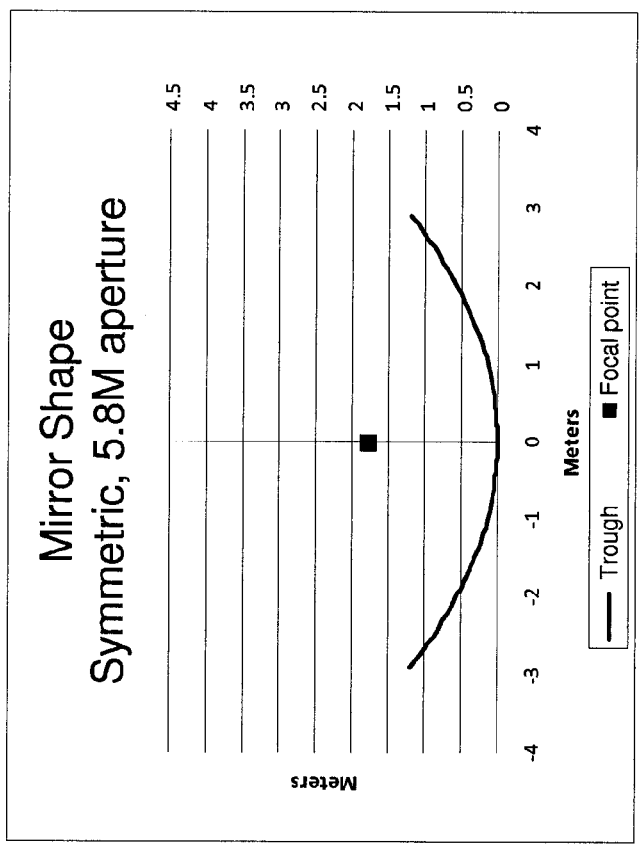
Figures 10A, 10B:
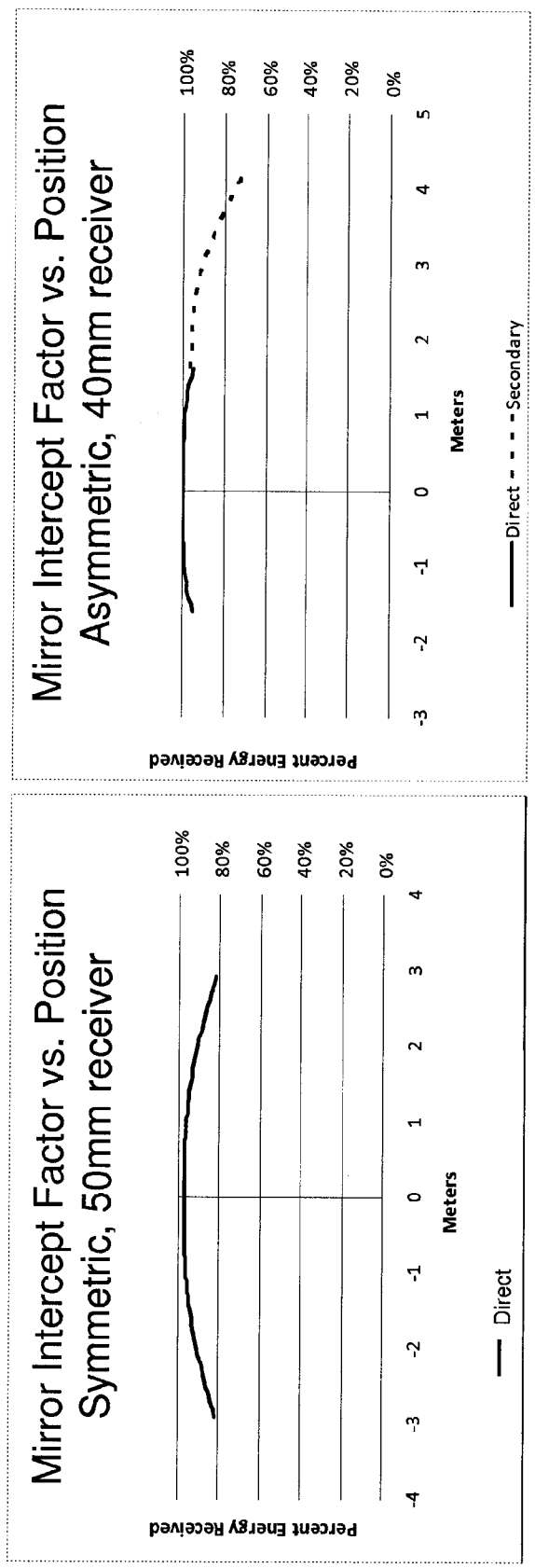
FIGS. 10a and 10b respectively illustrate percent of energy received at a solar receiver under equal conditions for each point in an aperture of a solar concentrator, respectively for a bilaterally symmetric trough and a trough with a shortened focal length and a unilateral extension.

FIGS. 9*a* and 9*b* are graphs of a focal point and a shape of a mirror of a symmetric trough without an extension, and an asymmetric trough with an extension, respectively. Both troughs have an aperture of 5.8 meters. FIGS. 10*a* and 10*b* are, respectively, plots of percent of energy received at a receiver pipe for each trough. For the symmetric trough (with a relatively long focal length as illustrated in FIG. 10*a*), a receiver pipe of 50 mm diameter is used to achieve an intercept factor above 80% across the surface of the mirror while minimizing receiver pipe diameter. In FIG. 10*b*, a smaller receiver pipe of 40 mm is used, because the relatively shorter focal length of the asymmetric trough enables a higher average intercept factor with a smaller, and so more efficient, receiver pipe. The mirror of the extension section (termed the secondary in the plot) falls below an 80% intercept factor at its outside edge, but this edge is only used in summer, and the overall intercept factor of the asymmetric trough remains better than that of the symmetric trough. In FIG. 11*a*, performances of the symmetric and the asymmetric troughs are plotted together as a shade line progresses across the mirror. The asymmetric trough starts producing useful energy sooner as the shade line moves off the mirror, and in all positions of the shade line, outperforms the symmetric trough. FIG. 11*b* is a plot of the same data as a function of percent of the mirror surface that is shaded, and again demonstrates that the asymmetric trough outperforms the symmetric trough.

Selected Embodiment Details

In various embodiments and/or usage scenarios, the illustrated embodiments are related to each other. For example, in some embodiments, movable extension suspension member 5*m* of FIGS. 5*a*, 5*b*, 6*a*, and 6*b*, is appropriate for use in various embodiments as an implementation of fixed extension suspension member 5*f* of FIGS. 4*a* and 4*b*.

While the forgoing embodiments are described as having roof systems with peaks and gutters, other embodiments use alternate roof systems, such as peaked, arched, mansard, and Quonset-style roof systems, as well as variations and combinations thereof. In various embodiments, a partially transparent protective enclosure (such as a glasshouse or a greenhouse) uses glass to provide the transparency, and other embodiments use alternative transparent materials such as plastic, polyethylene, fiberglass-reinforced plastic, acrylic, polycarbonate, or any other material having suitable transparency to sunlight and sufficient strength (in combination with a supporting framework) to provide environmental protection.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible, consistent with the description, and are within the scope of the claims of the issued patent. The names given to elements are merely exemplary, and should not be construed as limiting the concepts described. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, operations, functions, or portions thereof.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other applications, and are not limited to the particular application or industry of the described embodiments. The invention is thus to be construed as including all possible modifications and variations encompassed within the scope of the claims of the issued patent.

What is claimed is:

1. A system comprising:
an at least partially enclosing structure establishing an interior region, at least a section of the enclosing structure enabling transmittance of solar radiation from the sun;
within the interior region, a line-focus concentrator coupled to suspension members to selectively rotate about a focal line to concentrate the solar radiation at the focal line, wherein all the suspension members comprise flexible wires, wherein the line-focus concentrator comprises a longitudinal, bilaterally symmetric primary portion and a secondary portion comprising a unilateral extension coupled to the primary portion; and
a counterweight attached to the line-focus concentrator to, at least in some rotational positions of the line-focus concentrator, counterbalance a weight of the line-focus concentrator.

2. The system of claim 1, wherein the primary portion comprises at least one reflective surface that in cross section at least approximates a segment of a parabolic curve.

3. The system of claim 1, wherein the primary portion comprises a continuous reflective surface that in cross section is a segment of a parabolic curve.

4. The system of claim 1, wherein the primary portion comprises a plurality of reflective surfaces corresponding in cross section to respective segments of a parabolic curve.

5. The system of claim 1, wherein the primary portion comprises a plurality of reflective facets.

6. The system of claim 1, wherein the unilateral extension of the secondary portion is articulated to the primary portion.

7. The system of claim 1, wherein the unilateral extension of the secondary portion is enabled to be moved into a position selected from at least one operational position and at least one stowed position.

8. The system of claim 7, wherein the at least one stowed position comprises a partially retracted position.

9. A system comprising:
an at least partially enclosing structure establishing an interior region, wherein the enclosing structure has a structural member and a section that enables transmittance of solar radiation from the sun;
within the interior region, a line-focus concentrator coupled to a drive mechanism to selectively rotate about a focal line to concentrate a fraction of the solar radiation at the focal line, wherein the line-focus concentrator comprises a longitudinal, bilaterally symmetric primary portion and a secondary portion comprising a unilateral extension coupled to the primary portion, wherein the structural member is above the line-focus concentrator, and wherein the structural member carries the drive mechanism; and
a counterweight attached to the line-focus concentrator to, at least in some rotational positions of the line-focus concentrator, counterbalance a weight of the line-focus concentrator.

10. The system of claim 9, wherein the line-focus concentrator is an asymmetric line-focus concentrator.

11. The system of claim 10, wherein the asymmetric line-focus concentrator is enabled to be selectively rotated at least in accordance with seasonal changes in declination of the sun.

12. The system of claim 10, wherein the unilateral extension of the secondary portion is enabled to be moved into a position selected from at least one operational position and at least one stowed position.

13. The system of claim 12, wherein the at least one stowed position comprises a partially retracted position.

14. The system of claim 12, wherein during at least a first interval of the year the secondary portion is enabled to be placed in the at least one operational position and during at least a second interval of the year the secondary portion is enabled to be placed in the at least one stowed position.

15. The system of claim 12, wherein the primary portion in cross section at least approximates a particular curvature and in the at least one operational position the unilateral extension of the secondary portion is enabled to act as a continuation of the particular curvature of the primary portion and shares the same focal line as the primary portion.

16. The system of claim 12, wherein the primary portion is a first line-focus concentrator, the focal line is a first focal line, and in the at least one operational position the secondary portion is enabled to act as a second line-focus concentrator having a second focal line.

17. The system of claim 16, further comprising:
within the interior region, a line-focus receiver enabled to operate coincident to the first focal line and a reflector enabled to operate coincident to the second focal line; and
wherein the reflector is enabled to redirect at least a portion of the solar radiation received from the second line-focus concentrator to the line-focus receiver.

18. The system of claim 16, further comprising:
within the interior region, a line-focus receiver enabled to operate coincident to the first focal line and a reflector enabled to operate coincident to the second focal line; and
wherein the second line-focus concentrator and the reflector are collectively enabled to focus at least a portion of the solar radiation received from the second line-focus concentrator onto the line-focus receiver.

19. The system of claim 9, wherein a rotation is in accordance with a predefined solar tracking strategy.

20. The system of claim 19, wherein the predefined solar tracking strategy comprises control of rotational positioning at least in part via closed-loop feedback.

21. The system of claim 20, wherein the closed-loop feedback uses at least one implementation technology selected from: mechanical, electromechanical, analog circuitry, sampled data, digital logic, stored-program digital-processor, continuous-time, or discrete-time.

22. The system of claim 20, wherein the predefined solar tracking strategy comprises enabling rotating the line-focus concentrator as determined by the closed-loop feedback to at least reduce an angle of incidence of rays of the sun with respect to a vector normal of the line-focus concentrator.

23. The system of claim 19, wherein the predefined solar tracking strategy comprises control of rotational positioning at least in part via a timer.

24. The system of claim 23, wherein the timer uses at least one implementation technology selected from: mechanical, electromechanical, analog circuitry, sampled data, digital logic, stored-program digital-processor, continuous-time, or discrete-time.

25. The system of claim 19, wherein the predefined solar tracking strategy comprises enabling rotating the line-focus concentrator at least at predetermined intervals to reduce an angle of incidence of rays of the sun with respect to a vector normal of the line-focus concentrator.

26. The system of claim 19, wherein the predefined solar tracking strategy comprises enabling at least occasionally rotating the line-focus concentrator to reduce an angle of incidence of rays of the sun with respect to a vector normal of the line-focus concentrator.

27. The system of claim 9, wherein the primary portion comprises at least one reflective surface that in cross section at least approximates a segment of a parabolic curve.

28. The system of claim 9, wherein the primary portion comprises a continuous reflective surface that in cross section is a segment of a parabolic curve.

29. The system of claim 9, wherein the primary portion comprises a plurality of reflective surfaces corresponding in cross section to respective segments of a parabolic curve.

30. The system of claim 9, wherein the primary portion comprises a plurality of reflective facets.

31. The system of claim 9, wherein the unilateral extension comprises at least one reflective surface and the unilateral extension in cross section at least approximates a segment of a parabolic curve.

32. The system of claim 9, wherein the unilateral extension of the secondary portion is enabled to rotate about a respective longitudinal axis that is parallel to the focal line.

33. The system of claim 9, further comprising a hinge enabling the unilateral extension of the secondary portion to rotate about a longitudinal axis that is parallel to the focal line.

34. The system of claim 9, wherein the unilateral extension of the secondary portion is articulated to the primary portion.

35. The system of claim 34, wherein an articulation is enabled by at least one movable joint.

36. The system of claim 9, further comprising: within the interior region, a line-focus receiver enabled to operate coincident to the focal line and stationary with respect to the structure.

37. The system of claim 9, wherein the rotation about the focal line of at least the primary portion is at a radial distance specified by a focal length.

38. The system of claim 37, wherein the focal length is a nominal focal length and the radial distance has an associated variance from the nominal focal length in view of one or more manufacturing, installation, maintenance, and operational tolerances.

39. A line-focus concentrator comprising:
a longitudinal bilaterally symmetric primary portion at least approximating a parabolic curvature; and
a secondary portion comprising a unilateral extension movably coupled to the primary portion, the unilateral extension having a first operational mode in which it is positioned to continue the curvature of the primary portion and share with the primary portion a common longitudinal focal line, the unilateral extension having a second operational mode in which it is in a stowed position, wherein in the stowed position the unilateral extension does not continue the curvature of the primary portion,
wherein the line-focus concentrator is enabled to selectively rotate to an operational angle about the common focal line to concentrate thereon solar radiation from the sun, and
wherein in the first operational mode both the primary portion and the secondary portion reflect the solar radiation to the longitudinal focal line for all operational angles of the line-focus concentrator.

40. The line-focus concentrator of claim 39, wherein the rotation about the focal line of at least the longitudinal bilaterally symmetric portion is at a radial distance specified by a focal length.

41. The line-focus concentrator of claim 40, wherein the focal length is a nominal focal length and the radial distance has an associated variance from the nominal focal length in view of one or more manufacturing, installation, maintenance, and operational tolerances.

42. The line-focus concentrator of claim 39, wherein the primary portion comprises at least one reflective surface that in cross section at least approximates a segment of a parabolic curve.

43. The line-focus concentrator of claim 39, wherein the primary portion comprises a continuous reflective surface that in cross section is a segment of a parabolic curve.

44. The line-focus concentrator of claim 39, wherein the primary portion comprises a plurality of reflective surfaces corresponding in cross section to respective segments of a parabolic curve.

45. The line-focus concentrator of claim 39, wherein the primary portion comprises a plurality of reflective facets.

46. The line-focus concentrator of claim 39, wherein the unilateral extension comprises at least one reflective surface and the unilateral extension in cross section at least approximates a segment of a parabolic curve.

47. A system comprising:
a first line-focus concentrator and a second line-focus concentrator, each line-focus concentrator having:
a longitudinal, bilaterally symmetric primary portion at least approximating a parabolic curvature; and
a secondary portion comprising a unilateral extension movably coupled to the primary portion with a hinge, the unilateral extension having a first operational mode in which it is positioned to continue the curvature of the primary portion and share with the primary portion a common focal line, the unilateral extension having a second operational mode in which it is in a stowed position, wherein in the stowed position the unilateral extension is rotated around the hinge, and wherein in the stowed position the unilateral extension and the primary portion do not share the common focal line, wherein the first and second line-focus concentrators are rotatable about their respective common focal lines to concentrate thereon a fraction of solar radiation from the sun in the first operational mode, and wherein the first line-focus concentrator shades the second line-focus concentrator in at least some rotational positions.

48. The system of claim 47, wherein the primary portions of the first and second line-focus concentrators each comprises at least one reflective surface that in cross section at least approximates a segment of a parabolic curve.

49. The system of claim 47, wherein the primary portions of the first and second line-focus concentrators each comprises a continuous reflective surface that in cross section is a segment of a parabolic curve.

50. The system of claim 47, wherein the primary portions of the first and second line-focus concentrators each comprises a plurality of reflective surfaces corresponding in cross section to respective segments of a parabolic curve.

51. The system of claim 47, wherein the primary portions of the first and second line-focus concentrators each comprises a plurality of reflective facets.

52. The system of claim 47, wherein each of the unilateral extensions of the first and second line-focus concentrators is articulated to its respective primary portion.

53. The system of claim 47, wherein each of the unilateral extensions of the first and second line-focus concentrators is enabled to be moved into a position selected from at least one operational position and at least one stowed position.

\* \* \* \* \*

UNITED STATES PATENT AND TRADEMARK OFFICE
CERTIFICATE OF CORRECTION

PATENT NO. : 8,915,244 B2  Page 1 of 1
APPLICATION NO. : 13/730190
DATED : December 23, 2014
INVENTOR(S) : Peter Emery von Behrens It is certified that error appears in the above-identified patent and that said Letters Patent is hereby corrected as shown below:

In the Drawings

On sheet 13 of 13, in Figure 11b, line 1, delete "Combinded" and insert -- Combined --, therefor.

In the Specification

In column 9, line 7, delete "adjecent" and insert -- adjacent --, therefor.

In the Claims

In column 20, line 5, in claim 39, delete "longitudinal" and insert -- longitudinal, --, therefor.

In column 20, line 26, in claim 40, delete "longitudinal" and insert -- longitudinal, --, therefor.

Signed and Sealed this
Twenty-first Day of July, 2015

Michelle K. Lee
*Director of the United States Patent and Trademark Office*